(12) United States Patent
Bauman

(10) Patent No.: US 7,354,230 B2
(45) Date of Patent: *Apr. 8, 2008

(54) BIT HOLDING APPARATUS FOR USE WITH A POWER TOOL

(75) Inventor: Lynn Everett Bauman, Ephrata, PA (US)

(73) Assignees: Lynn Bauman, Ephrata, PA (US); Robert Renshaw, Glen Mills, PA (US); Patrick Anderson, Media, PA (US)

( * ) Notice: Subject to any disclaimer, the term of this patent is extended or adjusted under 35 U.S.C. 154(b) by 219 days.

This patent is subject to a terminal disclaimer.

(21) Appl. No.: 11/004,995

(22) Filed: Dec. 7, 2004

(65) Prior Publication Data

US 2005/0135890 A1    Jun. 23, 2005

Related U.S. Application Data

(60) Provisional application No. 60/531,617, filed on Dec. 23, 2003.

(51) Int. Cl.
B23B 51/08    (2006.01)

(52) U.S. Cl. ............... 408/239 R; 403/DIG. 4; 403/DIG. 6; 403/322.1; 403/322.2; 403/379.5; 403/361; 279/143; 81/451; 7/165

(58) Field of Classification Search ........... 408/238, 408/239 A, 239 R; 279/76, 79, 80, 143, 279/144, 145; 403/DIG. 4, DIG. 6, 322.1, 403/322.2, 361, 378, 379.5; 81/451; 7/165
See application file for complete search history.

(56) References Cited

U.S. PATENT DOCUMENTS 1,871,720 A    8/1932    Meunier
1,918,944 A *  7/1933    Wells et al. ............. 81/451
2,293,786 A    8/1942    Worden
2,361,683 A * 10/1944    Greenberg ............... 408/186
2,451,565 A   10/1948    Landow
2,465,309 A    3/1949    Happe et al.
2,536,017 A    1/1951    Bamberger (Continued)

FOREIGN PATENT DOCUMENTS

EP    891831 A1 *    1/1999

(Continued)

*Primary Examiner*—Monica Carter
*Assistant Examiner*—Michael W. Talbot
(74) *Attorney, Agent, or Firm*—Duane Morris, LLP

(57) ABSTRACT

An attachment (10) for use with a power tool (12) which can conveniently convert a rotatable chuck (14) or adapter (78) used with a first bit device (22) to usage with a second bit device (36) and vice versa. Either first or second bit device can be used for drilling, fastener driving or for other operations, however the preferred configuration is use with a first bit device for drilling pilot holes and a second bit device for driving of a fastener into the freshly drilled pilot hole. The attachment (10) is easily detachably securable with respect to any chuck (14) or adapter (78) which has a rotating cylindrical surface (18) with a locking aperture (20) therein. A capping ring (52) may be positioned in an annular slot (42) to retain a resilient member (48) positionable within an annular groove (40) for facilitating biasing of a locking pin (44) into a locking aperture (20) on the rotatably driven cylindrical mounting surface (18).

43 Claims, 13 Drawing Sheets

U.S. PATENT DOCUMENTS

| | | | |
|---|---|---|---|
| 2,714,026 | A | 7/1955 | Schultz |
| 2,927,614 | A | 3/1960 | Ransom |
| 2,931,659 | A | 4/1960 | Novkov |
| 3,023,015 | A | 2/1962 | Pankow |
| 3,135,522 | A | 6/1964 | Bell |
| 3,289,290 | A | 12/1966 | Sander |
| 3,405,949 | A | 10/1968 | Cox |
| 3,460,408 | A * | 8/1969 | Raymond ............. 408/112 |
| 3,484,114 | A | 12/1969 | Rodin |
| 3,527,273 | A * | 9/1970 | Falter ................. 81/429 |
| 3,734,515 | A | 5/1973 | Dudek |
| 3,751,051 | A | 8/1973 | Schmidt |
| 3,843,143 | A | 10/1974 | Laxson |
| 3,932,904 | A * | 1/1976 | Nilsson et al. ............. 7/158 |
| 3,965,510 | A * | 6/1976 | Ernst ..................... 7/158 |
| 3,973,784 | A | 8/1976 | Smith |
| 4,092,753 | A | 6/1978 | Fuhrmann |
| 4,218,794 | A | 8/1980 | Seidel et al. |
| 4,218,795 | A | 8/1980 | Ernst et al. |
| 4,224,969 | A | 9/1980 | Plessner |
| 4,277,074 | A * | 7/1981 | Kilberis .................. 279/60 |
| 4,413,937 | A | 11/1983 | Gutsche |
| 4,460,296 | A * | 7/1984 | Sivertson, Jr. ............. 408/124 |
| 4,512,693 | A | 4/1985 | Swanson |
| 4,676,703 | A | 6/1987 | Swanson |
| 4,840,387 | A * | 6/1989 | McCarthy ............. 279/134 |
| 4,844,488 | A * | 7/1989 | Flynn .................. 279/147 |
| 4,874,181 | A | 10/1989 | Hsu |
| 4,930,793 | A * | 6/1990 | Ando .................... 279/61 |
| 4,944,641 | A | 7/1990 | Alves |
| 5,033,921 | A | 7/1991 | Yasuhara et al. |
| 5,052,496 | A | 10/1991 | Albert et al. |
| 5,110,145 | A | 5/1992 | Stewart |
| 5,129,118 | A | 7/1992 | Walmesley |
| 5,191,666 | A | 3/1993 | Corbin |
| 5,224,230 | A * | 7/1993 | Vanicsek et al. ............. 7/158 |
| 5,234,296 | A * | 8/1993 | Presby et al. ............. 409/234 |
| 5,282,638 | A | 2/1994 | Harper |
| 5,309,799 | A | 5/1994 | Jore |
| 5,330,206 | A | 7/1994 | Krumszyn et al. |
| 5,342,154 | A * | 8/1994 | Holzer .................. 408/240 |
| 5,405,221 | A * | 4/1995 | Ducker et al. ............. 408/226 |
| 5,409,333 | A | 4/1995 | Hu |
| 5,417,527 | A | 5/1995 | Wienhold |
| 5,470,180 | A | 11/1995 | Jore |
| 5,564,717 | A * | 10/1996 | Alberts .................. 279/145 |
| 5,586,847 | A * | 12/1996 | Mattern et al. ......... 408/239 A |
| 5,651,647 | A | 7/1997 | Ray |
| 5,678,961 | A | 10/1997 | Fleege et al. |
| 5,711,043 | A | 1/1998 | Crawford et al. |
| 5,722,805 | A * | 3/1998 | Giffin .................. 408/239 R |
| 5,779,404 | A | 7/1998 | Jore |
| 5,785,468 | A | 7/1998 | Peritz |
| 5,797,302 | A | 8/1998 | Khoury |
| 5,870,935 | A | 2/1999 | Erickson et al. |
| 5,893,689 | A * | 4/1999 | Juhasz .................. 408/239 A |
| 5,938,212 | A | 8/1999 | Wadsworth |
| 5,951,026 | A | 9/1999 | Harman, Jr. et al. |
| 5,954,463 | A | 9/1999 | Jore |
| 6,000,888 | A | 12/1999 | Hartman |
| 6,033,162 | A | 3/2000 | Uebele et al. |
| 6,047,971 | A | 4/2000 | Harman, Jr. et al. |
| 6,053,675 | A | 4/2000 | Holland et al. |
| 6,079,716 | A | 6/2000 | Harman, Jr. et al. |
| 6,126,370 | A | 10/2000 | Wheeler et al. |
| 6,176,654 | B1 | 1/2001 | Jore |
| 6,224,303 | B1 | 5/2001 | Wheeler et al. |
| 6,241,434 | B1 | 6/2001 | Ajimi |
| 6,261,035 | B1 | 7/2001 | Moores, Jr. et al. |
| 6,293,559 | B1 | 9/2001 | Harman, Jr. et al. |
| 6,343,901 | B2 | 2/2002 | Wheeler et al. |
| 6,390,739 | B1 | 5/2002 | O'Banion |
| 6,394,715 | B1 | 5/2002 | Boyle et al. |
| 6,398,466 | B1 | 6/2002 | Wheeler |
| 6,419,430 | B2 | 7/2002 | Hangleiter |
| 6,474,656 | B1 | 11/2002 | Thomas |
| 6,488,452 | B1 * | 12/2002 | Hoskins et al. ......... 408/239 R |
| 6,511,268 | B1 | 1/2003 | Vasudeva et al. |
| 6,523,442 | B2 | 2/2003 | Lehnert et al. |
| 6,536,782 | B2 | 3/2003 | Rohm |
| 6,543,959 | B1 | 4/2003 | Jore |
| 6,550,786 | B2 | 4/2003 | Gifford et al. |
| 6,551,037 | B2 | 4/2003 | Gifford et al. |
| 6,648,563 | B2 | 11/2003 | Rohm |
| 6,688,611 | B2 | 2/2004 | Gifford et al. |
| 6,761,361 | B2 | 7/2004 | Taylor et al. |
| 7,086,813 | B1 | 8/2006 | Boyle et al. |
| 7,237,987 | B2 | 7/2007 | Hernandez, Jr. et al. |
| 7,244,080 | B2 | 7/2007 | Voss et al. |
| 2001/0042964 | A1 | 11/2001 | Bedi et al. |
| 2001/0043841 | A1 | 11/2001 | Wienhold |
| 2002/0020973 | A1 | 2/2002 | Cantlon |
| 2002/0020974 | A1 | 2/2002 | Wu |
| 2002/0093151 | A1 | 7/2002 | Monge |
| 2003/0077136 | A1 | 4/2003 | Rohm |
| 2003/0178796 | A1 | 9/2003 | Pjevach et al. |
| 2003/0230862 | A1 | 12/2003 | Peters et al. |
| 2004/0004329 | A1 | 1/2004 | Schroeder |
| 2004/0012161 | A1 | 1/2004 | Chiu |
| 2004/0021276 | A1 | 2/2004 | Allan et al. |
| 2004/0026877 | A1 | 2/2004 | Taylor et al. |
| 2004/0056435 | A1 | 3/2004 | Bedi et al. |
| 2004/0094908 | A1 | 5/2004 | Cantlon |
| 2004/0096286 | A1 | 5/2004 | Hsiao |
| 2004/0124593 | A1 | 7/2004 | Lin |
| 2004/0141818 | A1 | 7/2004 | Kuhn |
| 2004/0164503 | A1 | 8/2004 | Fan-Chiang et al. |
| 2004/0262856 | A1 | 12/2004 | Cantlon |
| 2005/0031424 | A1 | 2/2005 | Hernandez, Jr. |
| 2005/0105983 | A1 | 5/2005 | Hernandez, Jr. |
| 2005/0191139 | A1 | 9/2005 | Hofbrucker et al. |
| 2005/0244293 | A1 | 11/2005 | Voss et al. |
| 2006/0076738 | A1 | 4/2006 | Zhou |
| 2006/0088393 | A1 | 4/2006 | Cooper |
| 2006/0181033 | A1 | 8/2006 | Chen |
| 2006/0228181 | A1 | 10/2006 | Kozak |
| 2006/0233622 | A1 * | 10/2006 | Bauman ............. 408/239 R |
| 2007/0098507 | A1 | 5/2007 | Whitehead |

FOREIGN PATENT DOCUMENTS

GB 2063114 A * 6/1981

* cited by examiner

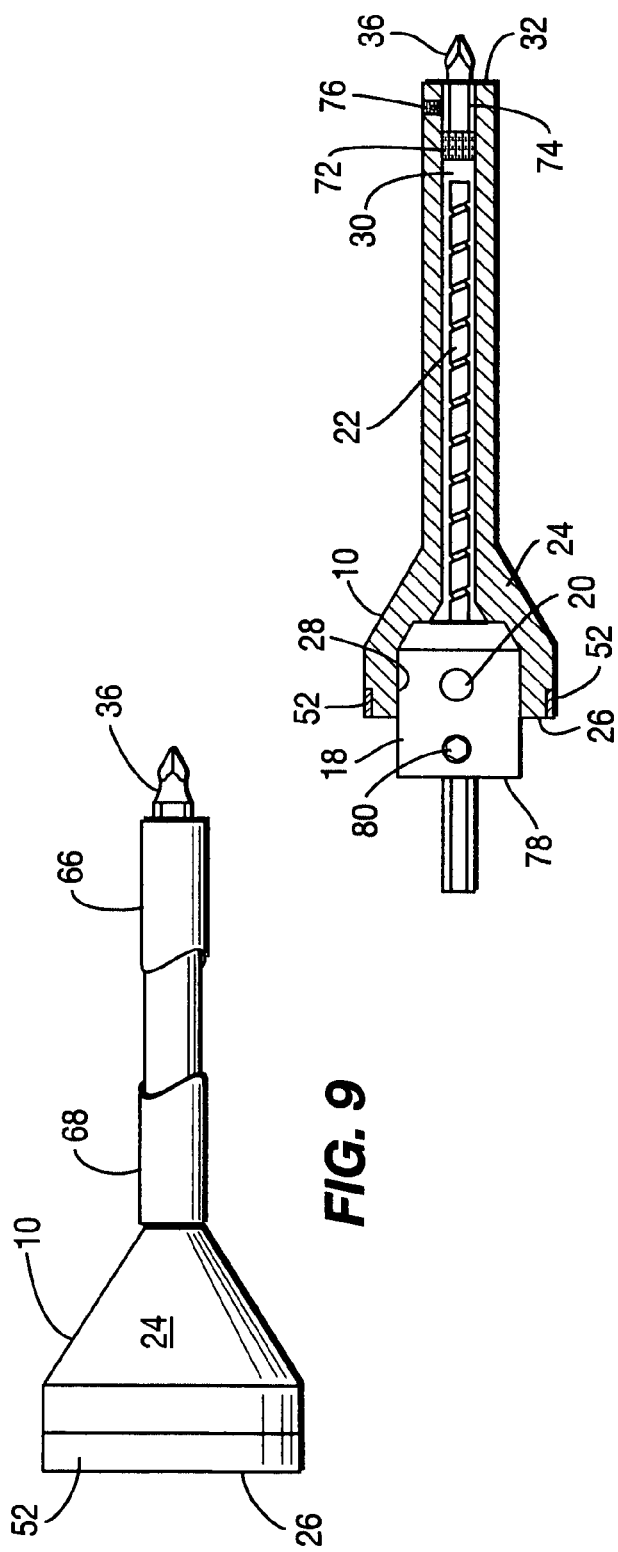

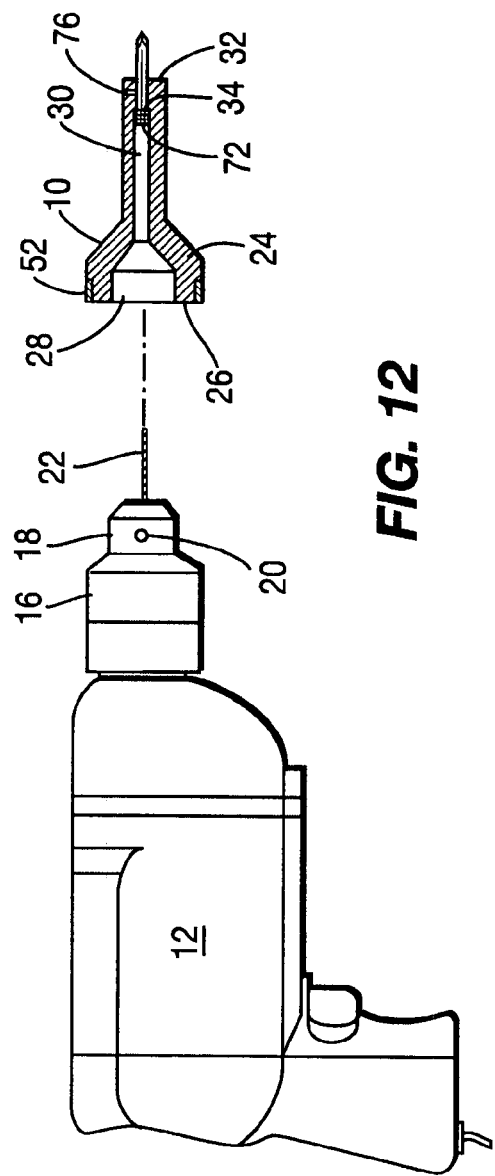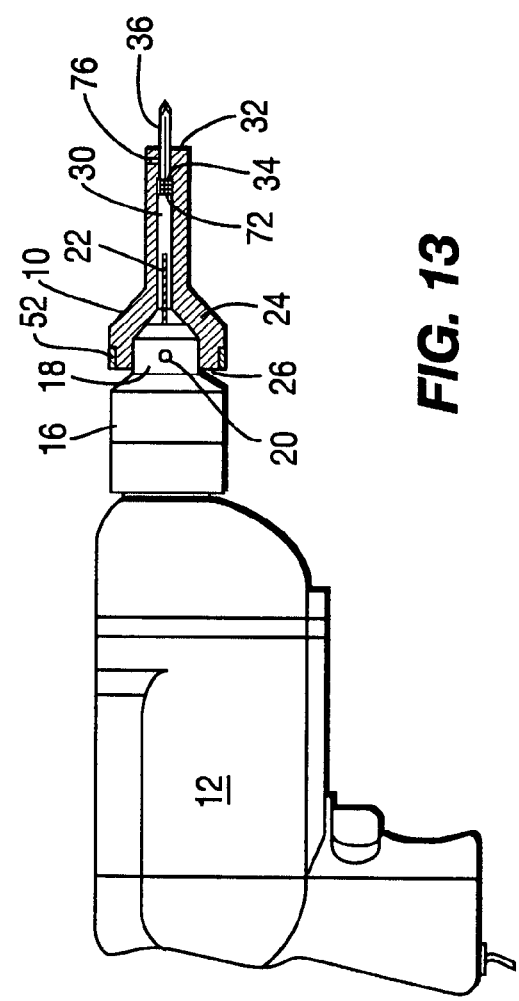

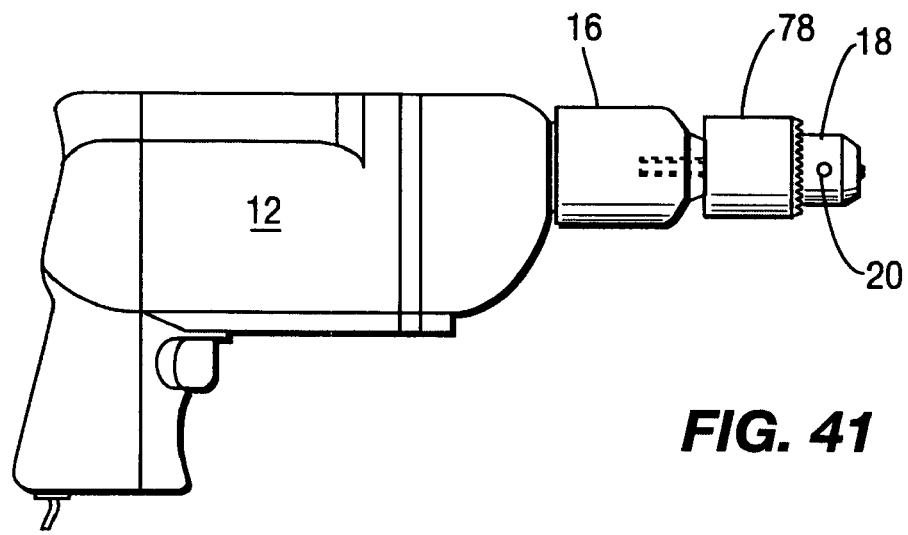
FIG. 41
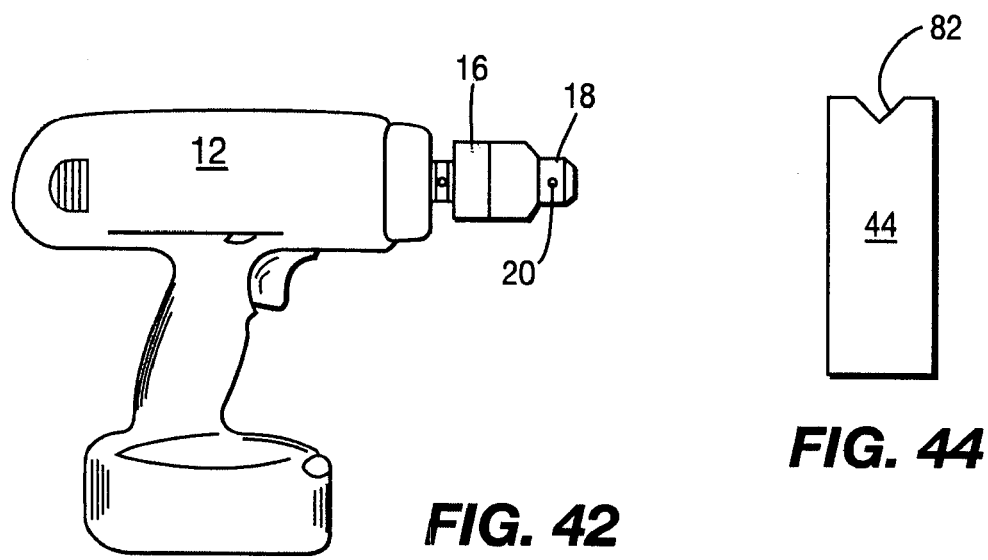
FIG. 42
FIG. 44
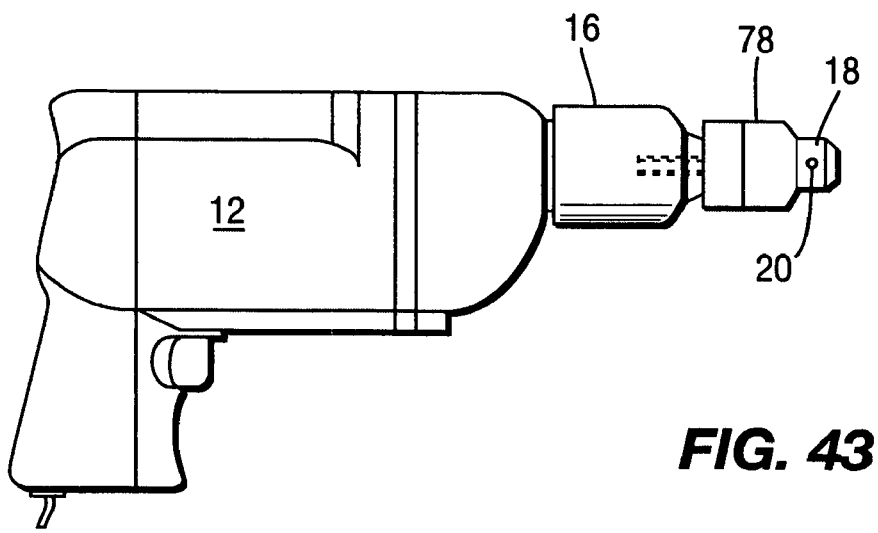
FIG. 43

BIT HOLDING APPARATUS FOR USE WITH A POWER TOOL

This application claims priority of the filing date of U.S. Provisional Patent Application No. 60/531,617 filed Dec. 23, 2003 on "Chucks and Screw Attachments for a Tool System", which is now abandoned, and was filed by the herein named inventor, Lynn Everett Bauman, which provisional patent application is hereby formally incorporated by reference as an integral part of the present application.

BACKGROUND OF THE INVENTION

1. Field of the Invention

The present invention relates to power tools and, particularly, to the use of power tools including rotating drive mechanisms such as drive chucks and impact wrench drive tools adapted to drill holes such as pilot holes as well as for driving of fasteners and other operations commonly performed in the field of construction. The present invention provides a means for facilitating the changeover from one bit to another and is particularly useful for rapidly and repeated transferring between drilling mode and fastener driving mode with a single power tool without requiring disengagement of any bits from the bit retaining means.

The keyless chuck was designed to facilitate ease of rapid transfer between various bits used for different purposes in common power tools, however, it is still significantly time consuming and burdensome to repeatedly disengage one bit such as a drill bit or a driving bit over and over again when performing common construction tasks such as drilling pilot holes and then driving a fastener into each of these pilot holes with an appropriate fastener. This construction activity is still very time consuming even when utilizing the more commonly used keyless chuck devices that are currently widely available. Many changeovers or transfers between one bit and another bit such as needed between drilling and driving mode would need to be made, often as many as one hundred or even more per hour, when performing common construction activities, such as, for example, during the installation of decking. The savings of time during the performing of these activities when utilizing the attachment of the present invention is a significant advantage in reducing the labor cost in such jobs.

Another common tactic to avoid repeated bit changes is to utilize two separate power drills, one set up with a first bit device such as a drill bit and the other tool having a second bit device such as a driving bit mounted therein. However, this procedure introduces additional expense since two power tools are needed and also requires the constant switching back and forth between the two separate power tools, which are fairly large and can be quite expensive. The present invention allows the easy use of two different bits with a single power tool without requiring disengagement of either bit when used over and over in an alternating fashion.

2. Description of the Prior Art

Many patents have been granted illustrating devices for facilitating use of bit devices for various purposes such as drilling and driving of fasteners thereinto which claim to expedite rapid conversation between these two modes of operation for use with power tools such as corded or rechargeable hand drills or impact drivers as well as many others. Examples of such patents include U.S. Pat. No. 1,871,720 patented Aug. 16, 1932 to L. F. Meunier and assigned to Chicago Pneumatic Tool Company on an "Attachment For Driving Spindles"; and U.S. Pat. No. 2,293,786 patented Aug. 25, 1942 to E. C. Worden and assigned to The Billings & Spencer Company on a "Wrench"; and U.S. Pat. No. 2,451,565 patented Oct. 19, 1948 to M. Landow on a "Chuck Adapter"; and U.S. Pat. No. 2,465,309 patented Mar. 22, 1949 to R. Happe et al and assigned to The Singer Manufacturing Company on a "Chuck Adapter For Portable Electric Tools"; and U.S. Pat. No. 2,536,017 patented Jan. 2, 1951 to A. A. Bamberger and assigned to Speedo Manufacturing Co., Inc. on a "Rotary Tool Hand Piece"; and U.S. Pat. No. 2,714,026 patented Jul. 26, 1955 to G. E. Schultz and assigned to R. C. S. Engineering Corp. on a "Rotating Tool Connector"; and U.S. Pat. No. 2,927,614 patented Mar. 8, 1960 to R. B. Ransom on a "Countersinking Tool"; and U.S. Pat. No. 2,931,659 patented Apr. 5, 1960 to R. E. Novkov and assigned to Portage Double-Quick Inc. on a "Quick Change Tool Holder"; and U.S. Pat. No. 3,023,015 patented Feb. 27, 1962 to M. W. Pankow on a "Reversible Bit Drill Attachment"; and U.S. Pat. No. 3,135,522 patented Jun. 2, 1964 to W. Bell and assigned to Expansion Industries corporation on a "Drill Chuck"; and U.S. Pat. No. 3,289,290 patented Dec. 6, 1966 to R. P. Sandor on a "Method And Apparatus For Installing Fasteners"; and U.S. Pat. No. 3,405,949 patented Oct. 15, 1968 to J. R. Cox and assigned to Balas Collet Company on a "Tool Holder"; and U.S. Pat. No. 3,484,114 patented Dec. 16, 1969 to E. A. Rodin on a "Screw Installing Attachment For Power Tools"; and U.S. Pat. No. 3,734,515 patented May 22, 1973 to E. C. Dudek and assigned to Thor Power Tool Company on a "Power Wrench With Interchangeable Adapters"; and U.S. Pat. No. 3,843,143 patented Oct. 22, 1974 to T. E. Laxson on a "Chuck Adapter"; and U.S. Pat. No. 3,973,784 patented Aug. 10, 1976 to D. A. Smith on a "Cutting Tool Adaptor"; and U.S. Pat. No. 4,092,753 patented Jun. 6, 1978 to M. E. Fuhrmann on a "Combination Drill And Screwdriver"; and U.S. Pat. No. 4,218,794 patented Aug. 26, 1980 to B. Seidel et al and assigned to Illinois Tool Works Inc. on a "Hole-Drilling And Fastener-Driving Combination Tool"; and U.S. Pat. No. 4,218,795 patented Aug. 26, 1980 to R. J. Ernst et al and assigned Illinois Tool Works Inc. on a "Drill Bit With Fastener-Driving Collar Assembly"; and U.S. Pat. No. 4,224,969 patented Sep. 30, 1980 to J. A. Plessner on a "Universal Chuck Adaptor"; and U.S. Pat. No. 4,413,937 patented Nov. 8, 1983 to G. E. Gutsche on "Elements For A Tool System"; and U.S. Pat. No. 4,874,181 patented Oct. 17, 1989 to S. Hsu on a "Coupling Member For Securing A Drilling Head To The Rotatable Rod Of A Pneumatic Tool Body"; and U.S. Pat. No. 4,944,641 patented Jul. 31, 1990 to A. Alves on a "Clutch Engager Sleeve"; and U.S. Pat. No. 5,033,921 patented Jul. 23, 1991 to S. Yasuhara et al and assigned to Koyo Seiko Co., Ltd. and Showa Tool Co., Ltd. on a "Traction Drive Tool Adapter"; and U.S. Pat. No. 5,052,496 patented Oct. 1, 1991 to G. P Albert et al and assigned to Ingersoll-Rand Company on an "Apparatus For Attaching Power Tool Housing Extensions"; and U.S. Pat. No. 5,110, 145 patented May 5, 1992 to P. A. Stewart on a "Power Tool Adaptor"; and U.S. Pat. No. 5,129,118 patented Jul. 14, 1992 to M. W. Walmesley on an "Accessory Tool Apparatus For Use On Power Drills"; and U.S. Pat. No. 5,191,666 patented Mar. 9, 1993 to L. N. Corbin on a "Drill Adapter"; and U.S. Pat. No. 5,282,638 patented Feb. 1, 1994 to D. L. Harper on a "Conversation Device For Drills"; and U.S. Pat. No. 5,309,799 patented May 10, 1994 to M. B. Jore on a "Transparent Sleeve Screw Holding And Driving Tool"; and U.S. Pat. No. 5,330,206 patented to L. M. Krumszyn et al on Jul. 19, 1994 and assigned to Luba Krumszyn on an "Adapter For Power Tools"; and U.S. Pat. No. 5,409,333 patented Apr. 25, 1995 to D. Hu and assigned to Ho-Shuenn Huang and Dye-Jon Hu on a "Multiply Functioned Drill Means"; and U.S. Pat. No. 5,651,647 patented Jul. 29, 1997 to R. J. Ray and assigned to GBR Pilot Master, Inc. on an "Auxiliary Chuck And Screwdriver For Electric Drills"; and U.S. Pat. No. 5,678,961 patented Oct. 21, 1997 to D. W. Fleege et al on a "Quick Change Adapter"; and U.S. Pat. No. 5,711,043 patented Jan. 27, 1998 to T. J. Crawford et al and assigned to Diversified Fastening Systems, Inc. on a "Set Tool And Cap"; and U.S. Pat. No. 5,797,302 patented Aug. 25, 1998 to J. F. Khoury on a "Screwdriver Adapted To Be Coupled To An Electric Drill For Automatic Rotation Thereof"; and U.S. Pat. No. 5,951,026 patented Sep. 14, 1999 to W. G. Harman, Jr. et al and assigned to Black & Decker Inc. on a "Removable Chuck"; and U.S. Pat. No. 6,033,162 patented Mar. 7, 2000 to K. Uebele et al and assigned to Firma DreBo Werkseug-Fabrik GmbH on a "Bit Adaptor"; and U.S. Pat. No. 6,523,442 patented Feb. 25, 2003 to M. W. Lehnert et al and assigned to AcraDyne Inc. on a "Torque Tool Assembly".

SUMMARY OF THE INVENTION

The apparatus of the present invention provides improved attachments having a housing which defines a mounting end at one end thereof and a forward end for either drilling or driving at the opposite end thereof. A mounting cavity is defined within the mounting end of the housing and faces outwardly therefrom. This mounting cavity is adapted to receive and detachably retain a cylindrical mounting section of the rotatable chuck of a power tool or an adapter mounted therewithin. The cylindrical mounting surface is preferably approximately 0.75 inches in diameter. The rotatable chuck or adapter is designed to receive a first bit device detachably mounted therein. A forward cavity is also defined in fluid flow communication with respect to the mounting cavity which is adapted to be able to receive a portion of a first bit device therewithin responsive to attachment of the cylindrical mounting section of a rotatable chuck or the cylindrical mounting section of an adapter within the mounting cavity.

The forward end of the attachment includes a forward bit securement device therein for detachably receiving and retaining of a second bit device. The first and second bit devices can comprises many different types of bits such as conventional twist drill bits or other drill bits or fastener driving bits such as slotted head driving bits, square head driving bits, phillips head driving bits and nut setters. In the preferred method of usage of the apparatus of the present invention, the first bit device will be for drilling pilot holes and the second bit device will be for driving of the fasteners into the associated pilot holes. This is a common construction activity that would otherwise require the time consuming repeated switching between two bit devices.

The housing of the present invention preferably defines an annular groove at a position extending around the mounting cavity and an annular slot which extends peripherally around the mounting cavity and also around the outer periphery of the annular groove. At least one locking pin device is movably mounted within the housing and is adapted to be positioned extending into the mounting cavity to be selectively movable at least partially into the mounting cavity itself for extending thereof into a locking aperture to facilitate detachable engagement therewith to securing the cylindrical mounting section of the rotatable chuck of the power tool or of the adapter with respect to the mounting cavity of the housing. The locking pin can also be positioned extending into the annular groove to facilitate biasing thereof inwardly.

A resilient biasing means, such as a circular spring means, may be positioned within the housing in such a manner that it extends around the mounting cavity. An annular slot can be defined in the housing extending around the circular spring means. A capping ring, preferably made of aluminum, can be positioned within the annular slot extending over the circular spring means to facilitate retaining thereof beneath the ring as well as also for safety purposes. The resilient biasing device or circular spring can be adapted to be brought into abutment with respect to each locking pin for resiliently urging thereof inwardly toward a locking aperture defined in the cylindrical mounting section of a rotatable chuck or adapter responsive to positioning thereof within the mounting cavity to facilitate detachable engagement therebetween. Each locking pin can optionally also include a notch in the portion thereof that abuts the resilient biasing means to facilitate the exertion of biasing force thereagainst.

This capping ring will act as a protective cap to facilitate retaining of the resilient biasing means tightly in position in biasing abutment with respect to the locking pin or pins. The capping ring can also be positioned extending around the annular groove with the resilient biasing spring positioned therewithin to facilitate securement of the biasing means within the annular groove to prevent it from extending partially outwardly therefrom during powered rotation of the attachment. Retaining of the resilient biasing means within the housing or within the annular groove is especially important when the attachment is rotating at high speeds at which times it has a tendency to be released or to partially extend outwardly from the rotating attachment which can prove very dangerous to the operator or nearby persons. It should be appreciated that, with the present invention, the power tool with which the attachment is usable is normally a hand drill or other similar tool with a rotatable chuck designed to retain therewithin a bit device such as a drilling and/or driving member. To facilitate use of the present invention with various different configurations of the more common of the currently available power tools with rotatable chucks, the present invention can also include an adapter device which is designed to hold a first bit which can be used for drilling or driving or other operations. Engagement of the chuck or adapter with respect to the attachment mechanism of the present invention will facilitate quick changeover between different bits in order to produce various construction operations such as, but not limited to, drilling and driving.

An important optional characteristic of the present invention is the inclusion of an intermediate cavity positioned between the forward cavity and the mounting cavity which is in fluid flow communication with both. This cavity is designed to allow bit devices of larger diameter than conventional round twist drill bits such as drill bits to be positioned in the main chuck mounting device or adapter. By making this intermediate cavity larger in diameter than the forward cavity, larger first bits can be utilized without requiring that first bit device to be removed when the attachment is placed in engagement with the cylindrical mounting surface of the chuck or adapter. There are a number of examples of such larger bit devices commonly used now such as a drill bit with a countersinking attachment or a drill bit with a self-centering guided device mounted thereon and many others. Others might include a drill bit with a collet adapter or drill bits with hex-shaped drive shanks. Also the present invention is usable with a nut or hex driver bit chosen as the first bit device and these bits are significantly larger than standard twist drill bits. This intermediate cavity allows the attachment of the present invention to be usable with the various configurations of these significantly larger bit devices. Preferably this intermediate cavity is larger than the forward cavity but smaller than the mounting cavity to facilitate this manner of usage.

The resilient biasing device is preferably a circular spring which is split at one location therealong to define a first spring end section and a second spring end section spaced somewhat apart but fairly close to being adjacent. It is desirable that this circular spring be prevented from axial movement along the annular groove because the two spring end sections should be the portions of the springs that are in abutting contact with the locking pins for maintaining biasing thereof in a generally inward direction toward the cylindrical mounting section. For this purpose an anti-clocking pin can be included which will be fixedly secured in a position between the first spring end and the second spring end to minimize movement of the circular spring axially around the attachment and in this manner maintain the proper desired alignment between the circular spring and the locking pins. With configurations including the annular groove, the anti-clocking pin will preferably be pressed into the groove between the first spring end section and the second spring end section of the circular spring. Many other manners of securement of the anti-clocking pin into the annular groove are contemplated under the present invention such as threaded engagement. The anti-clocking pin is optionally with the present invention, since other means of preventing clocking are also contemplated such as a shoulder protruding from the housing which restricts clocking movement of the spring in the annular groove. Preferably two locking pins are included which extend inwardly toward the mounting cavity such as to be angularly oriented obliquely with respect to the radial direction therein. These two locking pins are preferably spatially disposed from one another and angled obliquely in opposite directions to facilitate engagement with one or more apertures for engaging a locking aperture defined in the cylindrical mounting section irrespective of whether the cylindrical mounting section is rotated in the clockwise or counterclockwise direction during engaging movement thereof. Inward movement of the two locking pins can be limited by a shoulder construction for each. A first shoulder can limit the radially inwardly directed movement of the first locking pin and is defined by the housing. The housing can also define a second shoulder positioned adjacent to the second locking pin which limits the radially inwardly directed movement thereof.

The present invention can also include a guide sleeve device mounted on the housing adjacent to the forward end which is telescopically movable longitudinally with respect to the housing between a retracted storage position which encircles the housing adjacent the forward end thereof and an extended operative position extending forwardly from the forward end of the housing. In this manner, the guide sleeve will be movable to the extended operative position in order to surround a second bit secured to the forward end of the housing for maintaining proper alignment thereof for use. Thus the guide sleeve apparatus is particularly useful in those situations where the second bit secured to the forward end of the housing by the forward bit securement means is chosen to be a fastener driving bit. With the guide sleeve device in the extended operative position it can surround a fastener driving bit for facilitating engaging of a fastener thereto when driving thereof. A magnetic retaining means can also be included within the forward cavity to facilitate securement of various different types of second bit devices therewithin. A set screw may also be included to facilitate securement of a second bit to the forward end of the housing by the forward bit securement means.

The apparatus of the present invention is particularly usable with power tools provided with chucks which have conventional key operated locking mechanisms for holding bits secured therewithin. However, the present invention is also made usable with any type of chuck for a power tool by the inclusion of an adapter device mounted in the original equipment chuck of the power tool which includes the necessary cylindrical mounting section and defines at least one locking aperture in this cylindrical mounting section which allows securement of the attachment device of the present invention thereto for facilitating use of the unique bit holding apparatus of the present invention. With this configuration, the adapter becomes an integral component of the improved bit holding apparatus of the present invention and greatly widens the various modes of uses of the apparatus of the present invention.

It is an object of the present invention to provide an improved bit holding apparatus usable with a power tool for greatly facilitating detachable mounting of two different bit devices thereto, such as for example, a drilling bit device and a fastener bit device, wherein use with various sizes of drilling devices or variously configured fastener driving devices is made possible.

It is an object of the present invention to provide an improved bit holding apparatus usable with a power tool for facilitating detachable mounting of multiple bits devices with respect thereto such as a drilling device and a fastener driving device with respect thereto wherein use is possible with drill bits having countersinking devices, self-centering guided devices, and collet adapters which can include various drive shank configurations such as hex-shaped drive shanks and many others.

It is an object of the present invention to provide an improved bit holding apparatus usable with a power tool for facilitating detachable mounting of a drilling device and a fastener device with respect thereto wherein rapid changeover between drilling and driving bit devices, or two different drilling devices, or two different driving bit devices or any other combination of bit devices is facilitated with a power tool having any type of original equipment chuck mechanism.

It is an object of the present invention to provide an improved bit holding apparatus usable with a power tool for facilitating detachable mounting of various bit devices such as drilling devices and/or a fastener devices or others with respect thereto wherein cost is minimized.

It is an object of the present invention to provide an improved bit holding apparatus usable with a power tool for facilitating detachable mounting of various different types or sizes of bit devices with respect thereto wherein maintenance requirements are minimal.

It is an object of the present invention to provide an improved bit holding apparatus usable with a power tool for facilitating detachable mounting of bit devices such as drilling devices and/or a fastener devices of various sizes and configurations with respect thereto wherein usage with most different types of powered tools having rotatable output is possible.

It is an object of the present invention to provide an improved bit holding apparatus usable with a power tool for facilitating detachable mounting of many different types and sizes of drilling devices and fastener devices is possible wherein the safety considerations of such high speed rotating chucks is actively controlled.

It is an object of the present invention to provide an improved bit holding apparatus usable with a power tool for facilitating detachable mounting of various bit devices with respect thereto wherein use with many different types of chucks is made possible such as use with a keyless chuck or keyed chuck.

It is an object of the present invention to provide an improved bit holding apparatus usable with a power tool for facilitating use of two different bit devices with respect thereto wherein use with any and all types of power tools is possible regardless of the particular means for powering thereof.

It is an object of the present invention to provide an improved bit holding apparatus usable with a power tool which can be used for facilitating detachable mounting of a drilling device and/or a fastener device with respect thereto and which enables a person to purchase a chuck and mount it directly in a power tool or a power tool chuck that they already own.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 9 is a side view of an alternative configuration of the attachment device of the present invention shown including an embodiment of the guide sleeve shown in the retracted storage position;

FIG. 10 shows a side view of the configuration of FIG. 9 in the extended operating position particularly useful for maintaining a fastener in proper alignment and engaged with respect to a fastener driving bit located therewithin attached to the forward end of the housing;

FIG. 11 shows a side view of an embodiment of the attachment of the present invention used with the cylindrical mounting surface of an adapter;

FIG. 12 is a side assembly view showing a power tool with an embodiment of a new rotatable keyless chuck and an embodiment of the new attachment device of the present invention;

FIG. 13 is a cross-section of the embodiment shown in FIG. 12 with the attachment device installed;

FIG. 41 is a side plan view of a power tool with a conventional keyless chuck with a further alternative embodiment of an adapter of the present invention mounted therein wherein the adapter itself comprises a keyed mounting chuck with a male ended adapter;

FIG. 42 is a side plan view of an embodiment of the present invention showing an impact wrench with a double sleeve keyless chuck with a socket end mounted therein which includes a rotatable cylindrical section with at least one locking aperture defined therein;

FIG. 43 is a side plan view of an embodiment of the present invention showing a power tool with a conventional keyless chuck and a double sleeve keyless adapter mounted therein which defines the cylindrical rotating surface with at least one locking aperture therein; and FIG. 44 is an embodiment of the locking pin of the present invention showing the optional locking pin notch in the upper end thereof to facilitate maintenance of biasing engagement between the resilient biasing means and the locking pin.

DETAILED DESCRIPTION OF THE PREFERRED EMBODIMENT

Figure 1:
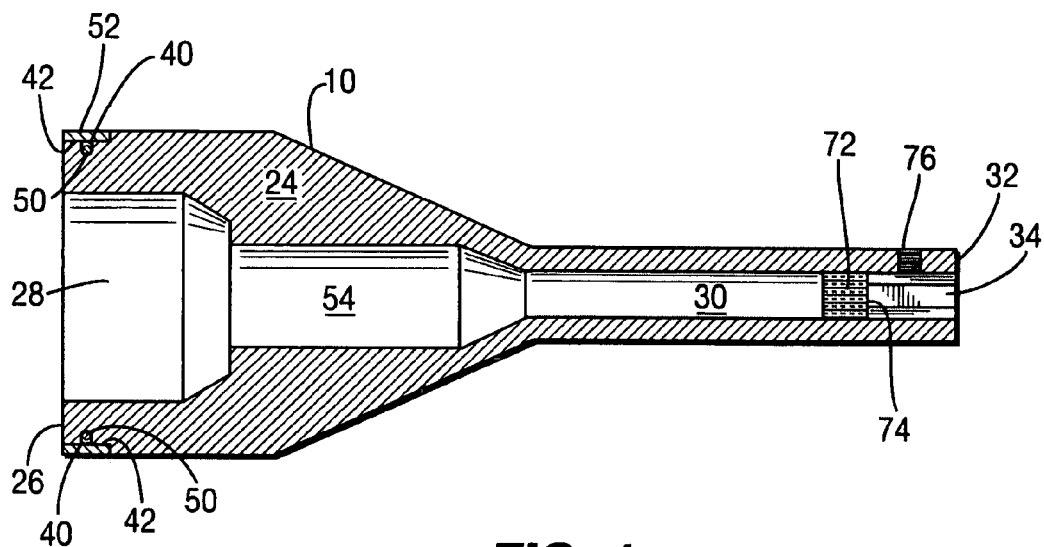
FIG. 1 is a sectional view of an embodiment of the attachment device of the present invention showing a protective ring and an enlarged intermediate cavity.

The present invention provides a uniquely improved bit holding attachment device 10 which is particularly usable for alternately drilling pilot holes and driving fasteners 38 therein. It can also be implemented for use of many other different combinations of bit devices such as drilling and drilling, driving and drilling or driving and driving. This universal utility is an important aspect of the present invention. The attachment 10 can hold one bit detachably securable to the cylindrical portion 18 of the adapter 78 or chuck 14 and the adapter 78 or chuck 14 will, itself, hold the other bit. Alternating usage of the two held bit devices 22 and 36 is achieved by alternately mounting the attachment 10 for allowing operation of the second bit device 36 and alternately removing the attachment 10 for allowing use of the first bit device 22. Thus, it is certainly much faster and easier to merely remove or secure the attachment 10 with respect to the cylindrical surface 18 of the chuck 14 or adapter 78 to change bit devices, than it would be to actually change the bit mounted in the chuck 14 each time a change is needed.

The attachment also and more generally can be used for quickly switching between two bit devices of most configurations and is usable with a power tool 12 having a rotatable chuck 14, or possibly also an adapter 78, which includes a rotatably driven cylindrical mounting section 18 defining at least one locking aperture 20 thereon. The rotatable chuck 14 of the power tool 12 is defined to receive an attachment 10 secured with respect thereto. For securement the rotatable chuck 14 will preferably include a cylindrical mounting surface 18 thereon of approximately 0.75 inches in diameter. Some such original equipment manufactured power tools do not include a cylindrical mounting surface 18 with a locking aperture 20 defined therein because of the advent of more common usage and availability of keyless rotatable chucks 16, both single sleeved and double sleeved. Thus, the present invention requires such a cylindrical mounting surface 18 in order for the attachment 10 to be securable thereto. For this purpose the present invention is particularly usable with chucks 14 which require chuck keys for tightening of articles such as bits within the jaws thereof or keyless chucks 16, adapters 78 or set screw mandrels 84 which themselves define cylindrical mounting surfaces 18 with at least one or more locking apertures 20 therein.

An older design was shown in U.S. Pat. No. 3,484,114 by E. A. Rodin on a "Screw Installing Attachment For Power Tools" patented Dec. 16, 1969. The present invention includes some aspect of that invention but also provides many very significant improvements over that design in both the configuration of the attachment device 10 itself as well as in the capability for more universal usage with respect to power tool attachments such as keyless rotatable chucks 16 or set screw mandrel chucks 84.

The present invention further defines the use of an adapter 78 detachably securable with respect to the rotatable chuck 14 of a power tool 12 directly or with respect to the rotatable keyless chuck 16 to provide a means for mounting of various different bit devices 22 therewithin while at the same time also providing the rotatably driven cylindrical mounting surface 18 with at least one locking aperture 20 therein. The inclusion of at least one locking aperture 20 will facilitate the rapid mounting and dismounting of the attachment 10 with respect to adapter 78 for allowing the driving of individual fasteners 38 into pilots holes immediately after each hole is individually drilled. This is just one of many possible manners of usage of the apparatus of the present invention.

The attachment 10 includes a housing 24 which defines a mounting end 26 on one end thereof and a forward end 32 on the opposite end thereof. The housing 24 is designed to be detachably securable to a rotatable cylindrical mounting surface 18 which defines at least one locking aperture 20 thereon for facilitating such detachable securement.

Figure 4:
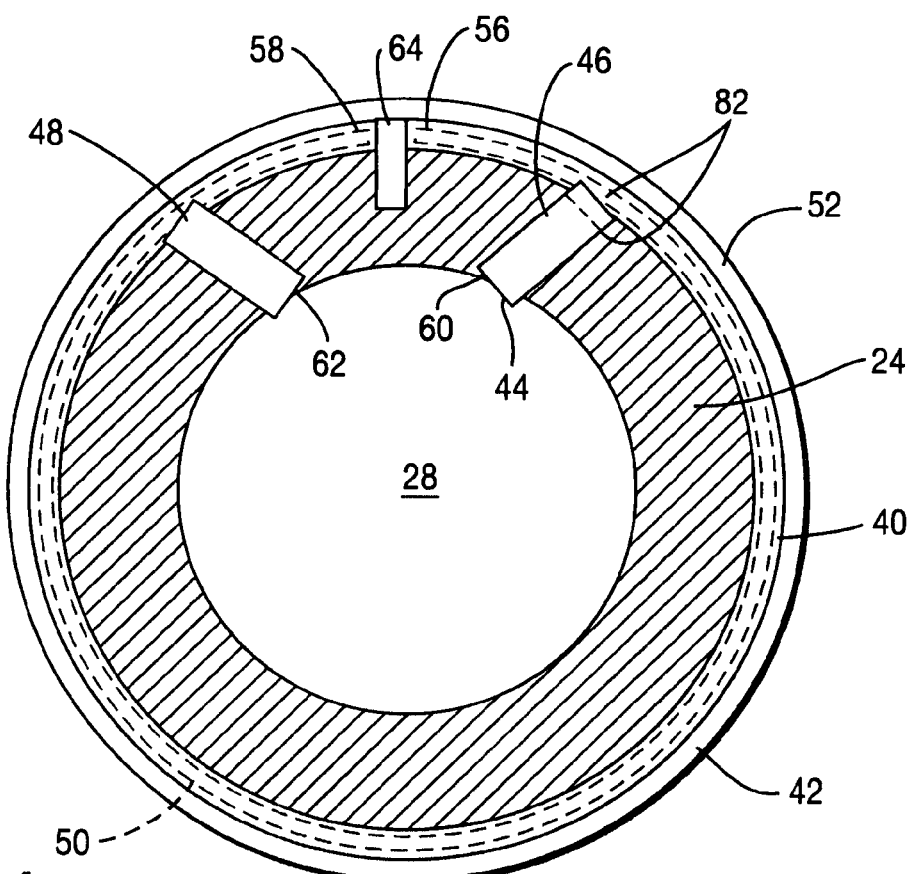
FIG. 4 is a cross-sectional view of an embodiment of an attachment device of the present invention showing the circular spring biasing the locking pins inwardly into the mounting cavity with the anti-locking pin in position between the ends of the spring.

The mounting end 26 of the housing 24 will preferably define a mounting cavity 28 therewithin which is open and faces outwardly therefrom. This mounting cavity 28 will preferably be round in cross-section and will be adapted to receive the cylindrical mounting surface 18 therewithin. The mounting cavity preferably includes one or more locking pins 44 therein which are radially biased inwardly by a resilient biasing means 50 such as a circular spring such that they can extend into the mounting cavity 28 and further into an adjacently positioned locking aperture 20 defined in the cylindrical mounting surface 18 for engagement therein when positioned within the mounting cavity 28. In this preferred embodiment, the locking pins 44 are biased inwardly by circular spring 50 such that one of them will extend at least partially into a locking aperture 20 for engagement therewith. Normally two locking pins 44 will be included such that they are angled radially in opposite oblique directions to facilitate locking thereof into an adjacent locking aperture 20 when engagement is achieved by either clockwise or counterclockwise rotation of the attachment 10 during engaging movement thereof relative to the cylindrical mounting surface 18. The first locking pin member 46 will engage a locking aperture 20 responsive to counterclockwise rotation of the attachment 10 as shown in FIG. 4. On the other hand, the second locking pin member 48 will engage a locking aperture 20 responsive to clockwise rotation of the attachment 10 as shown in FIG. 4. Thus, the attachment device 10 will be detachably and yet firmly secured upon the cylindrical mounting surface 18 of a rotatable chuck 14, keyless rotatable chuck 16, set screw mandrel 84 or an adapter 78. As such, the attachment device 10 will rotate simultaneously with the cylindrical mounting surface 18 until forcibly detached by a user by rotating the attachment 10 relative to the surface 18 such that the engaged locking pin 44 will be withdrawn from the locking aperture 20 with which it is engaged thereby allowing disengagement of the mounting cavity 28 of the attachment 10 from locking aperture 20. Preferably, the locking pin 44 will include a first locking pin member 46 angularly oriented in a first direction and a second locking pin member 48 angled oppositely. Both first locking pin member 46 and second locking pin member 48 are capable of engaging a locking aperture 20. By orienting the two locking pins 46 and 48 oppositely, positive engagement between the mounting cavity 28 of the attachment 10 and the cylindrical mounting surface 18 will be achieved despite whether the rotational chuck 14, keyless rotatable chuck 16, set screw mandrel chuck 84 or adapter 78 is being rotated in the counterclockwise or the clockwise direction, as described above. In either case, at least one of the two locking pins 46 and 48 will be brought into engagement with a locking aperture 20 defined in the cylindrical mounting surface 18. The resilient biasing means 50 can comprise a circular spring as described above, however, other types of springs and biasing members are also contemplated for usage with the present invention. For example, the resilient biasing means 50 could include a small individual compression spring associated with each individual locking pin 44 or many other possible resilient biasing devices.

Safely retaining of the circular spring or resilient biasing means 50 with respect to the housing 24 of the attachment 10 of the present invention is an important characteristic of the present invention. For this reason an annular groove 40 may preferably be included which is defined about the surface of housing 24 at a position extending peripherally around the outside of the mounting cavity 28. With the circular spring 50 positioned in the annular groove 40 it will be brought into abutment with respect to the outermost ends of the locking pins 44 to facilitate resilient biasing thereof inwardly toward the mounting cavity 28 in such a manner that each of the one or more locking pins 44 are ready to engage a locking aperture 20 defined in the cylindrical mounting surface 18. Also, to facilitate engagement between the one or more locking pins 44 and the circular spring 50, individual notches 82 may be defined in the outer tips of each of the locking pins 44. In this manner the circular spring 50 will abut each notch 82 to facilitate engagement with respect to the adjacent locking pin 44. It is important that the locking pins 44 not extend beyond a predefined distance into the mounting cavity 28 and for this reason a first shoulder 60 and a second shoulder 62 as best shown in FIG. 4 will be defined in the housing 24 to limit the extent of inward movement of the first locking pin 46 and the second locking pin member 48, respectively. Other configurations for biasing are contemplated for the construction of the resilient biasing means 50 such as individual springs mounted in the housing 24 and other such configurations which might not necessarily require the specific inclusion of the annular groove means 40.

Figure 2:
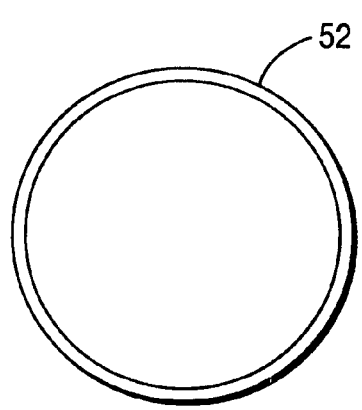
FIG. 2 is an end view of an embodiment of a capping ring of the present invention.
Figure 3:
FIG. 3 is a side cross-sectional view of an embodiment of a capping ring of the present invention.

With usage of the circular spring 50 as the resilient biasing means, it is further preferable that it be safely retained to the attachment 10 and/or within the annular groove 40. This can be achieved by the housing 24 including an annular slot 42 extending outside of and peripherally around the annular groove 40. A capping ring 52, as shown best in FIGS. 2 and 3, can be positionable within the annular slot 42 to extend like a cap over and preferably adjacent the upper portion of the annular groove 40 in such a manner that the circular spring 50 is retained therewithin and cannot be released therefrom for safety purposes, nor can it move to a position extending partially outwardly therefrom such that it could be dangerous whenever the cylindrical mounting surface 18 is rotating, especially at high speeds. This is an important consideration because the rotatable chuck 14 of such power tools 12 or an adapter 78 can rotate at fairly high speeds in both rotational directions and it is important that a safe and secure means for retainment of the circular spring 50 within the annular groove 40 be utilized while at the same time allowing full flexibility and movement of the spring 50 such that it can achieve the proper inwardly directed bias against the one or more locking pins 44. The capping ring 52, if included, would preferably made of an aluminum material.

Figure 5:
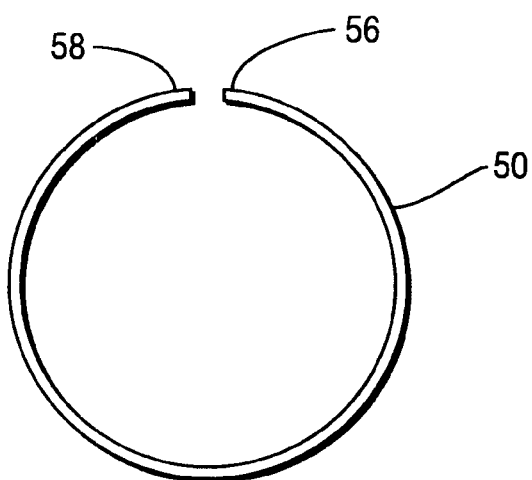
FIG. 5 is a side plan view of an embodiment of the resilient biasing means or spring of the present invention.
Figure 6:
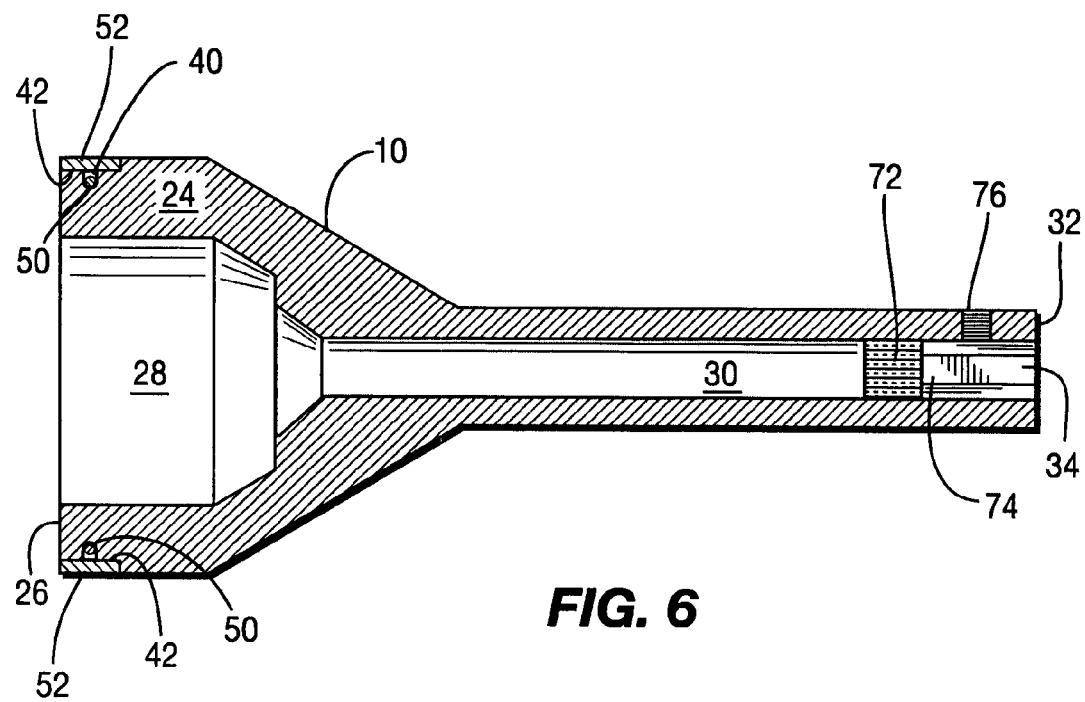
FIG. 6 is a side cross-sectional view of an alternative embodiment of the attachment device of the present invention.
Figure 7:
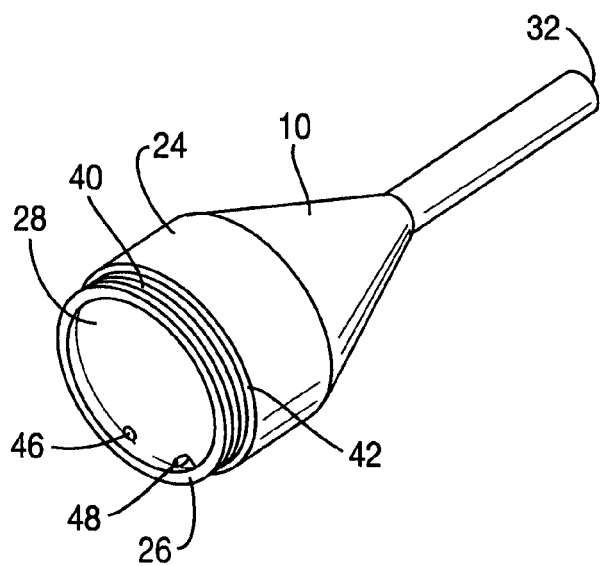
FIG. 7 is a three-quarter perspective illustration of an embodiment of the attachment device of the present invention.
Figure 8:
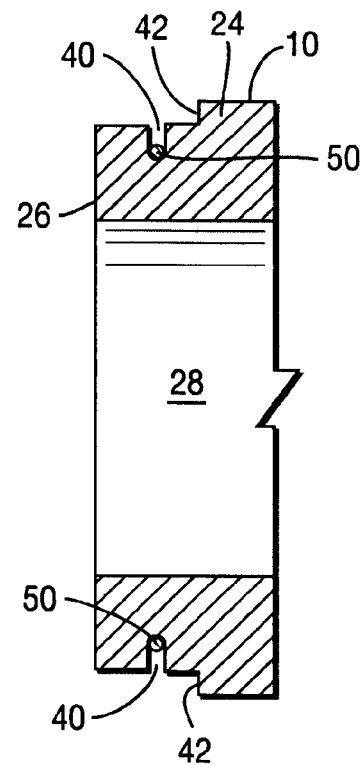
FIG. 8 is an exploded view of an embodiment of the mounting end of the attachment.
Figure 14:
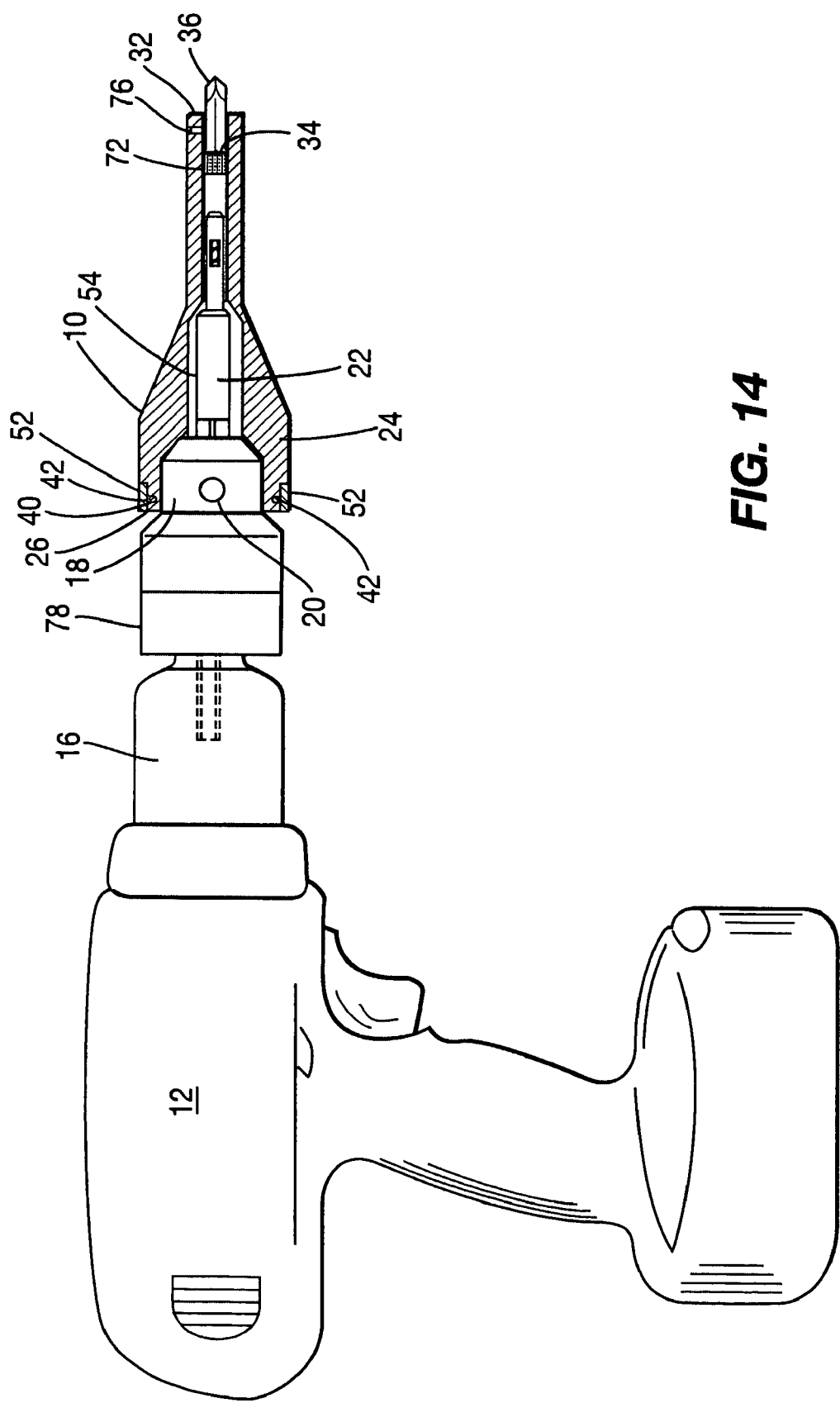
FIG. 14 is a side illustration of a power tool shown with an adapter mounted thereto including a cylindrical mounting surface for affixing with respect to the attachment device.
Figure 15:
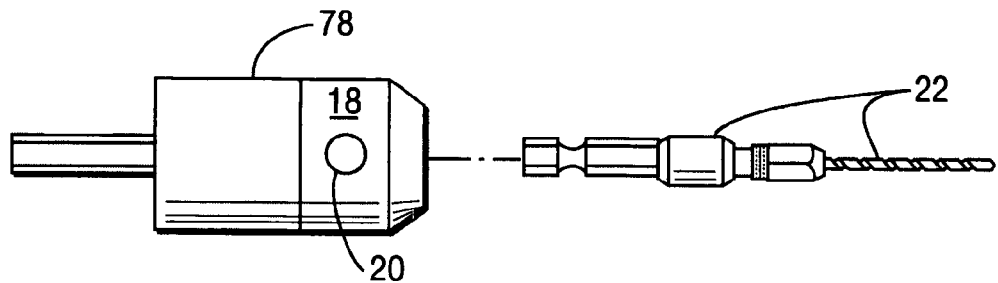
FIG. 15 shows a side view of an embodiment of an adapter or chuck used with the present invention shown securable with respect to a drill bit with a collet adapter.
Figure 16:
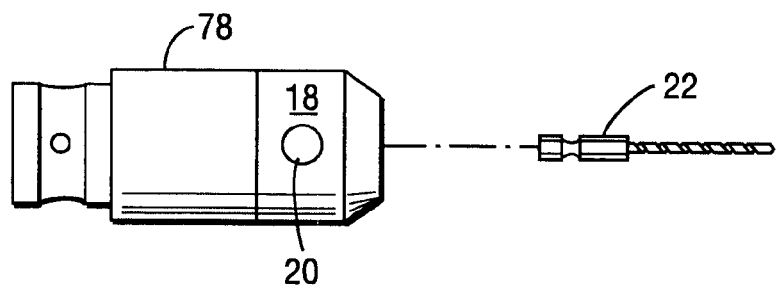
FIG. 16 is an alternative configuration for a chuck or adapter of the present invention shown with a drill bit device having an integral mounting portion with a hex sided configuration which can include a socket end for impact drivers.
Figure 17:
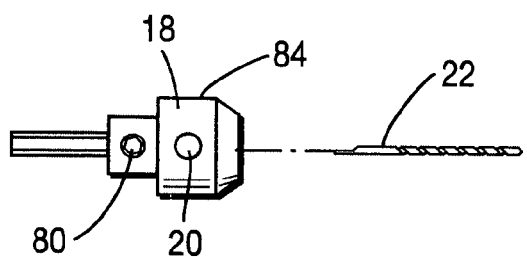
FIG. 17 is a side illustration of an embodiment of the present invention showing a set screw mandrel that takes a drill bit device with a slotted shank which can also take a round twist drill or a hex shank drilling device or a hex shank driving bit or be otherwise driven.
Figure 18:
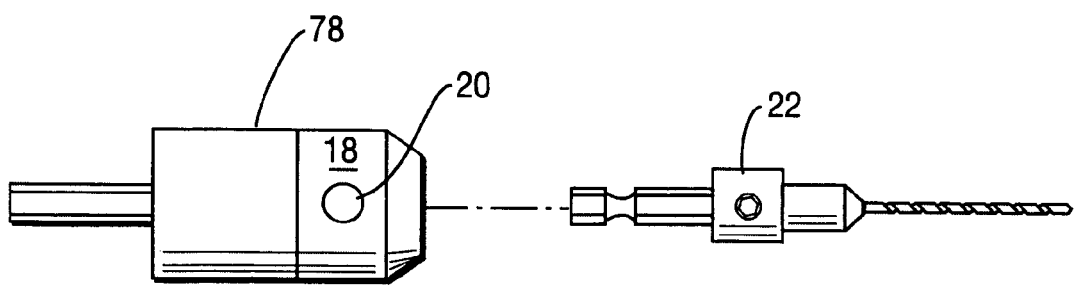
FIG. 18 is a side illustration of an embodiment of the present invention showing an adapter member or chuck shown securable with respect to a drill bit device which is hex driven or otherwise driven.
Figure 19:
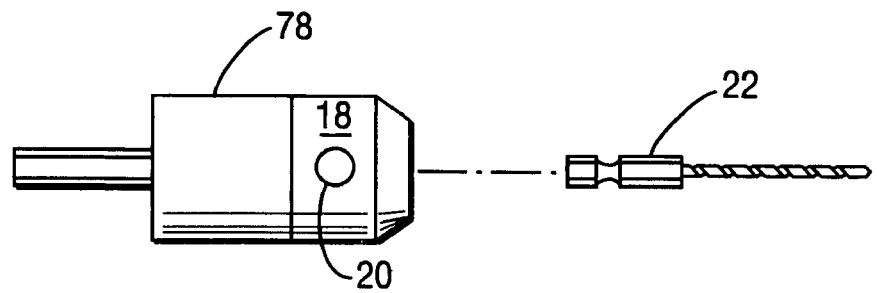
FIG. 19 is an alternative embodiment of an adapter or chuck usable with a bit device which is hex driven other otherwise driven.
Figure 20:
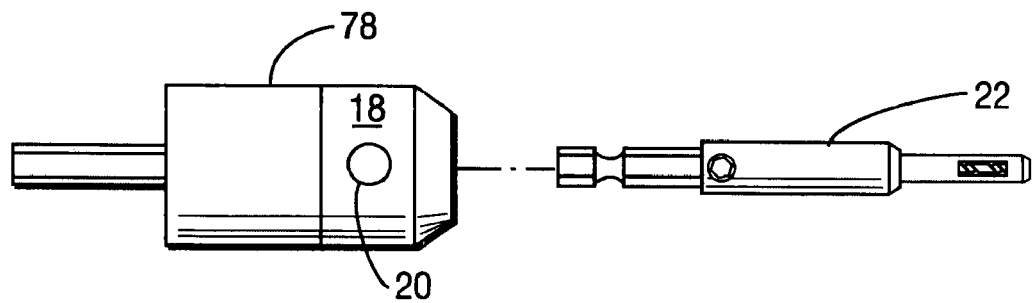
FIG. 20 is a side plan view showing an adapter or chuck securable with respect to a drill bit device with a self-centering guided sleeve.
Figure 21:
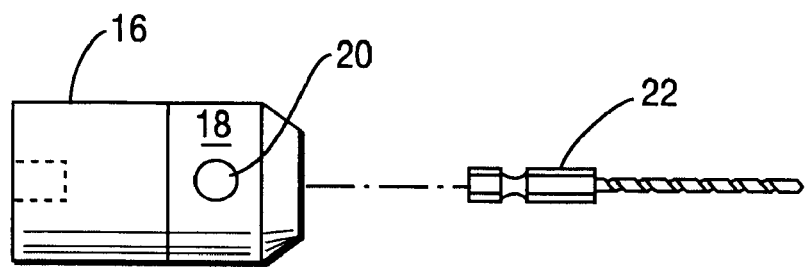
FIG. 21 is a side view of an embodiment of a keyless adapter or chuck shown securable with respect to a drill bit device with a hexagonal securement shaft attached thereto and a female drive engagement means.

It is preferable that the spring 50 be split along one portion thereof such as to define a first spring end section 56 and a second spring end section 58. This is best shown in FIG. 5. These ends 56 and 58 are defined to include the tips of the ends of the split spring 50 as well as the immediate areas of the spring 50 thereadjacent. These end section 56 and 58 are adjacent to one another but are spaced apart a small distance as shown in FIG. 5. These end sections 56 and 58 of the circular spring means 50 have greater flexibility than other portions thereof and it is preferable that the first spring end section 56 be positioned in engaging abutment with respect to a first locking pin member 46 for biasing it inwardly with increased strength. Similarly it is desired that the second spring end section 58 be positioned in abutment with respect to the second locking pin member 48, if it is included, for further facilitating inwardly directed bias thereadjacent radially inwardly.

It is very important to maintain the circular spring 50 in the proper orientation by restricting rotational or clocking movement thereof with respect to the housing 24. This movement restriction can be achieved by the inclusion of an anti-clocking pin 64 positioned extending into the annular groove 40 and pressed, or otherwise affixed, therein at a location between the end sections 56 and 58 of circular spring means 50. In this manner the anti-clocking pin 64 will be capable of being brought into abutment with the first spring end section 56 and/or the second spring end section 58, thus preventing clocking movement thereof axially along the annular groove 40. In this manner, movement of the spring 50 will be restricted within the annular groove 40, which will therefore maintain engagement between the first spring end section 56 and the first locking pin member 46 as well as maintaining engagement between the second spring end section 58 and the second locking pin member 48. Clocking pin 64 can also be mounted with respect to housing 24 by most other common mounting means such as threaded engagement and other means.

It should be appreciated that the present invention preferably includes two locking pins 46 and 48 but would be operational with the inclusion of only one locking pin, either pin 46 or pin 48 although with constructions including only one pin would allow securement to the cylindrical mounting surface 18 only responsive to engaging rotation in one direction, namely either clockwise or counterclockwise, but not both.

Figure 28:
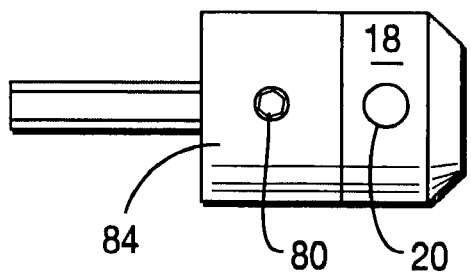
FIG. 28 is a side plan view of an embodiment of the present invention showing a chuck or adapter for use with the present invention including a set screw mandrel design.
Figure 29:
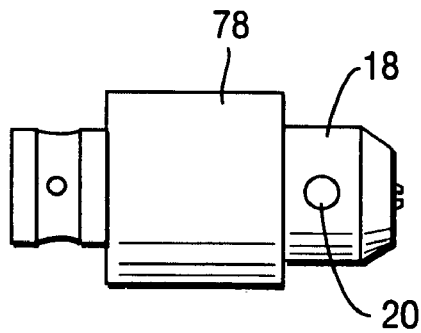
FIG. 29 is a side plan view of an embodiment of a keyless chuck or adapter with a socket end made in accordance with the present invention.
Figure 30:
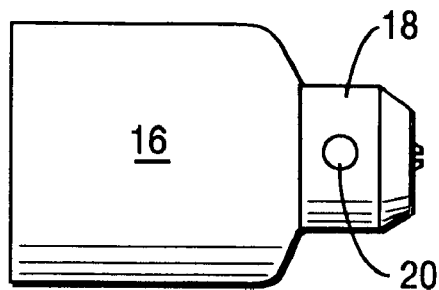
FIG. 30 is a side plan view of an embodiment of the present invention showing a single sleeve keyless chuck or adapter including a rotatable cylindrical section with at least one locking aperture defined therein.
Figure 31:
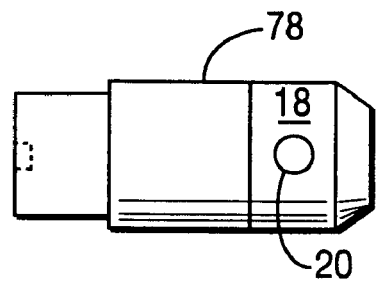
FIG. 31 is a side plan view of an alternative embodiment of the present invention showing a keyless chuck or adapter including a rotatable cylindrical section with at least one locking aperture defined therein.
Figure 32:
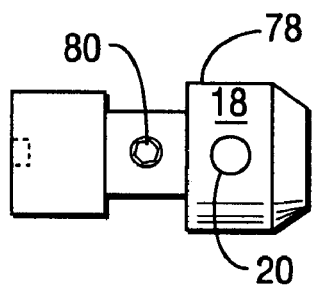
FIG. 32 is a side plan view of an alternative embodiment of the present invention showing a set screw mandrel chuck or adapter including a rotatable cylindrical section with at least one locking aperture defined therein.
Figure 33:
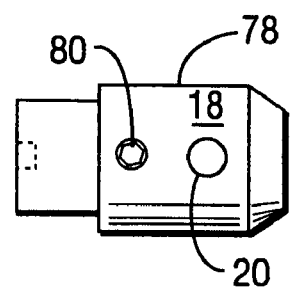
FIG. 33 is a side plan view of a further alternative embodiment of the present invention showing a set screw mandrel chuck or adapter including a rotatable cylindrical section with at least one locking aperture defined therein.
Figure 34:
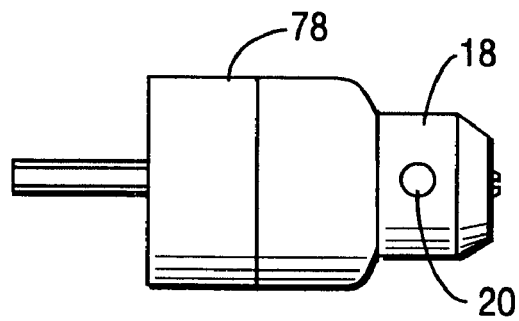
FIG. 34 is a side plan view of an embodiment of the present invention showing a double sleeve keyless chuck or adapter with a cylindrical mounting surface defining at least one locking aperture therein.
Figure 35:
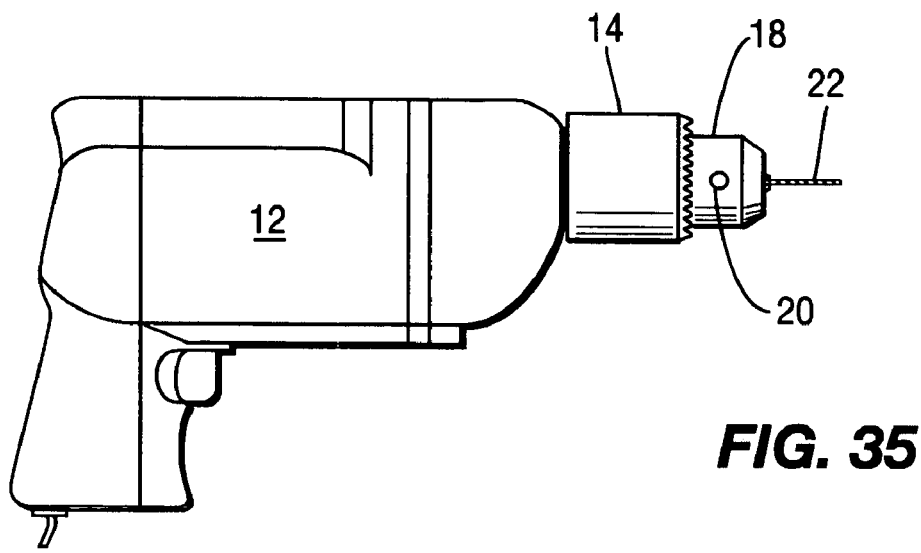
FIG. 35 is a side plan view of an embodiment of the present invention that illustrates a power tool with a conventional keyed chuck mounted therein.

The attachment device 10 of the present invention preferably also defines a forward cavity 30 which is designed to receive and retain a second bit device 36 secured thereto by a forward bit securement means 34. Often this second bit device will be a fastener driving means such as a hex, square or slotted screw driving bit. To facilitate the forward bit securement means 34 retaining of a second bit device 36 therein, a hole means 74 will preferably be defined therein usually with a hexagonal cross-section. This hexagonal cross-section will facilitate securement of various second bit devices 36 such as fastener driving devices with hexagonal driving shafts integrally formed therewith or attached thereto. Also a magnet 72 for retaining the second bit device 36 with respect to the forward end 32 of housing 24 may also be included in various configurations. Many second bit devices 36 can easily be secured detachably to the forward end 32 of housing 24 when used with the hexagonal shaped mounting holes 74 adapted to receive them. The attachment devices 10 of the present invention preferably can also include set screws 76 for further maintaining detachable securement therewith of the second bit devices 36. Also set screws 80 can be utilized particularly as shown in FIG. 28 to retain the bit devices 22 with respect to an embodiment of an adapter 78, a set screw mandrel 84, a rotatable keyless chuck 16 or a rotatable chuck 14 or 16 provided as a part of the present invention. Such set screw bit retaining devices are usable with respect to various configurations of chucks 14, keyless chucks 16, mandrels 84 and adapters 78 as shown in various Figures included herein.

An intermediate cavity 54 may be included in the present invention as shown best in FIG. 1. This intermediate cavity 54 will preferably be located between the mounting cavity 28 and the forward cavity 30. The purpose of the intermediate cavity 54 is to allow the chuck 14, keyless rotatable chuck 16, set screw mandrel chuck 84 or adapter 78 to be capable of receiving those first bit devices 22 which can be larger than standard twist drill bits, particularly those devices which are larger in diameter. Such first bit devices 22 may include larger bits such as countersinking devices integral therewith, drill bits with self-centering guided enclosures or devices therearound, drill bits with collet adapters or drill bits with hex-shaped drive shanks or otherwise driven. All of these bits are generally slightly larger in diameter than conventional round twist drill bits. Furthermore the intermediate cavity will more readily receive nut, nut setter or nut head driver bits or other similar bits which are usually significantly larger in diameter than standard twist drill bits themselves.

Another aspect of the present invention is the optional inclusion of a system including a guide sleeve 66. This configuration is shown in FIGS. 9 and 10 as an add-on device positionable around the forward end 32 of the attachment device 10. The guide sleeve 66 is initially oriented in the retracted storage position 68 as shown in FIG. 9 but is movable to the extended operative position 70 shown in FIG. 10 where it will be in surrounding engagement with respect to a second bit device 36 to facilitate use thereof. In this manner, for example, driving of fasteners into a substrate or other workpiece by a second bit device 36 which is a fastener driving bit device is greatly facilitated because the alignment of securement between the fastener driving bit and the fastener 38 is properly maintained. The guide sleeve 66 is preferably telescopingly movable with respect to the portion of the housing 24 which defines therewithin the forward cavity 30.

Figure 36:
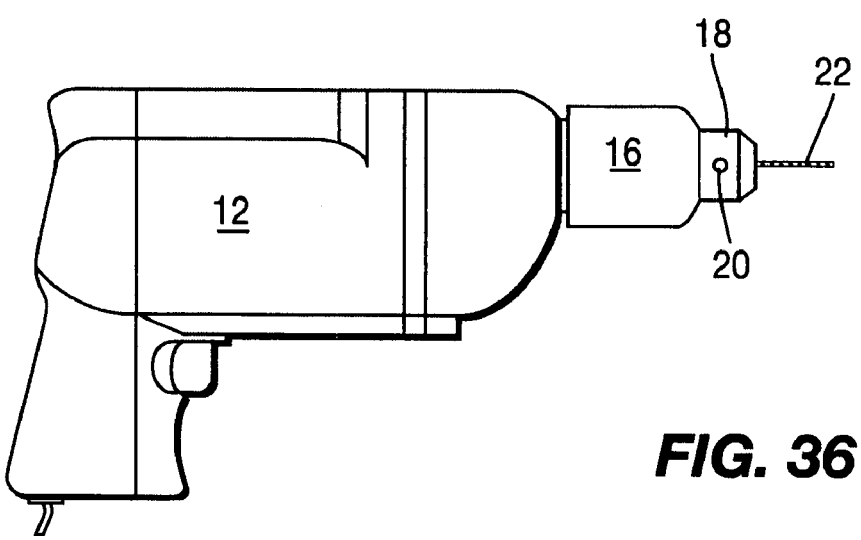
FIG. 36 is a side plan view of an embodiment of the present invention showing a power tool with a single sleeve keyless chuck mounted therein which includes a rotatable cylindrical section with at least one locking aperture defined therein.
Figure 37:
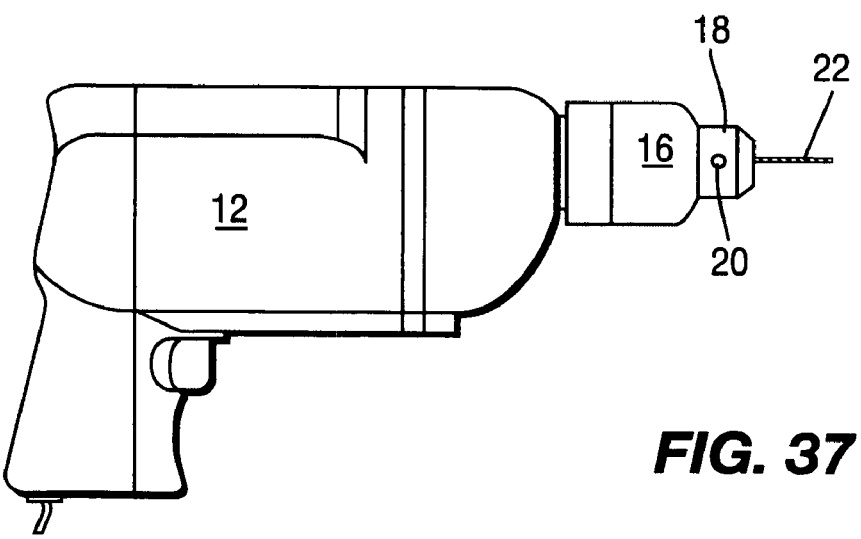
FIG. 37 is a side plan view of an embodiment of the present invention showing a power tool with a double sleeve keyless chuck mounted therein which includes a rotatable cylindrical section with at least one locking aperture defined therein.
Figure 38:
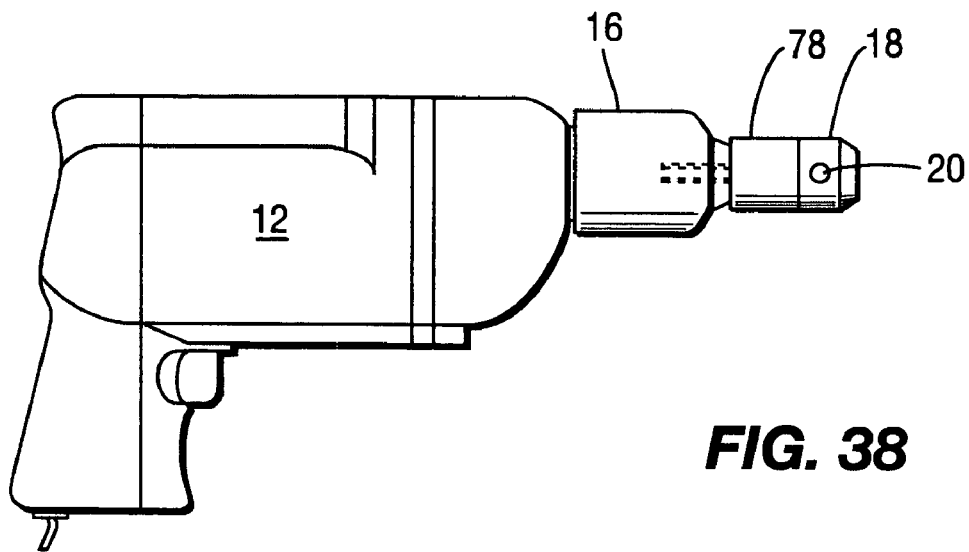
FIG. 38 is an illustration of a power tool showing a conventional keyless chuck with an embodiment of an adapter of the present invention mounted therein for use with the present invention.
Figure 39:
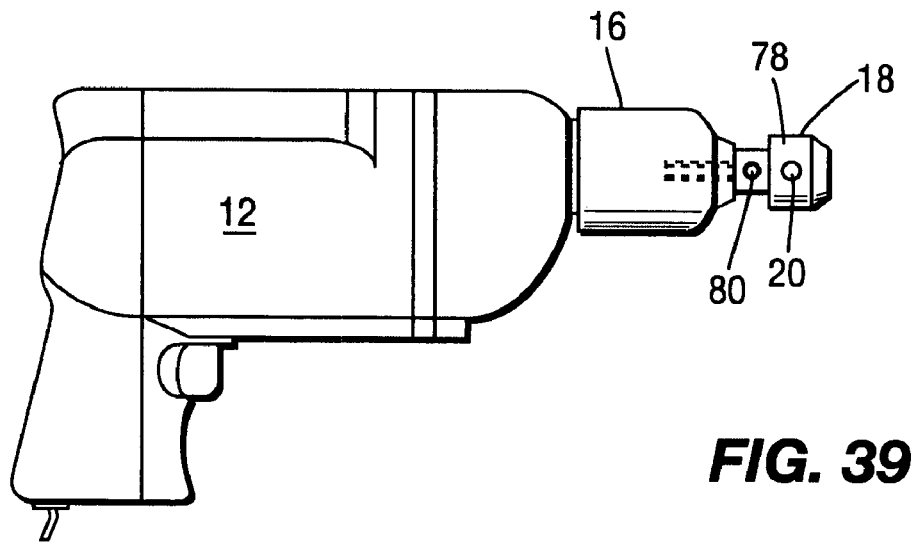
FIG. 39 is a side plan view of a power tool with a conventional keyless chuck with a further alternative embodiment of an adapter of the present invention mounted therein.
Figure 40:
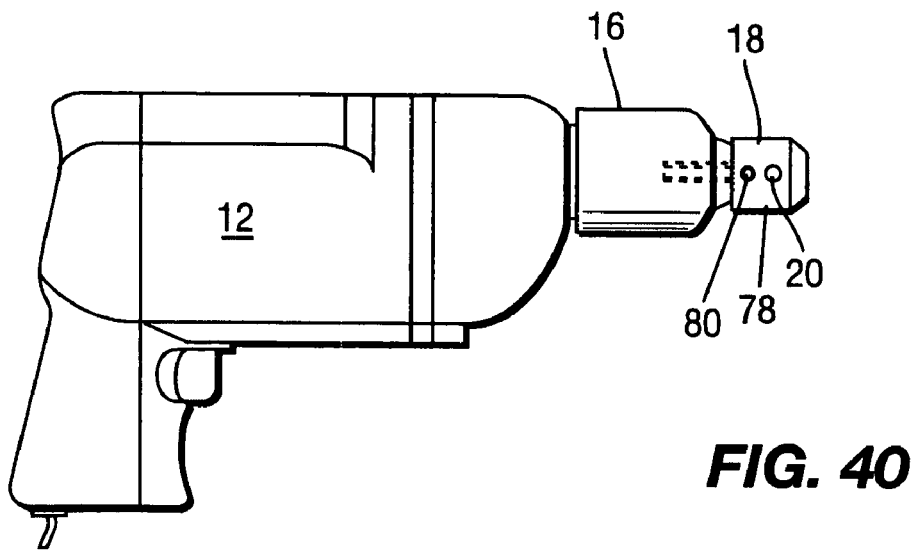
FIG. 40 is a side plan view of a power tool with a conventional keyless chuck with a further alternative embodiment of an adapter of the present invention mounted therein.

An important characteristic of the present invention is that the attachment device 10 includes a number of significant improvements over the prior art and is designed to be usable with a conventional key operated chuck design. Such devices were once commonly used but in current times keyless chucks have become much more popular. As such, the present invention can also include, as a component thereof, a keyless chuck 16 or adapter 78 with a cylindrical mounting surface 18 and at least one locking aperture 20 defined therein as shown best in FIGS. 36 through 40. FIG. 36 shows the single sleeve keyless chuck 16 and FIG. 37 shows the double sleeve keyless chuck 16 each of which includes the cylindrical mounting surface 18 with at least one locking aperture 20 defined therein. When this keyless chuck 16 or set screw mandrel 84 with a cylindrical mounting surface 18 is provided as a component or added item for the present invention, the original equipment chuck from a power tool such as a drill or impact wrench could be removed and replaced thereby. Alternatively, the provided rotatable chuck 14, keyless chuck 16, or set screw mandrel 84 can replace the original equipment chuck or an adapter member 78 can be mounted in the original equipment chuck. An adapter 78 can be positioned within a single sleeve keyless chuck 16 wherein each of the adapters 78 has a different configuration, however each of which commonly defines a cylindrical mounting surface 18 with at least one locking aperture 20 defined therein. Thus, it should be appreciated that for the purposes of the present invention many of the chucks 14 with cylindrical mounting surfaces 18 and at least one locking aperture 20 defined therein can be also be used as adapters 78 and many adapters 78 can also be used as chucks 14 having cylindrical mounting surfaces 18 defining at least one locking aperture 20. For the purposes of this invention the only difference between an adapter and a chuck is that a chuck is mounted directly into the power drill itself whereas the adapter is mounted into some other chucking device which itself is mounted in the power tool. Thus, an adapter 78 can be mounted in any type of mated chuck in order to provide a rotating cylindrical mounting surface 18 with one or more locking apertures 20 defined therein that can mate with the mounting cavity 28 of an attachment 10 made in accordance with the present invention. That chuck within which the adapter 78 is mounted can be original equipment or a device provided in accordance and along with the parts of the present invention or as a part optionally included with the apparatus of the present invention.

Figure 22:
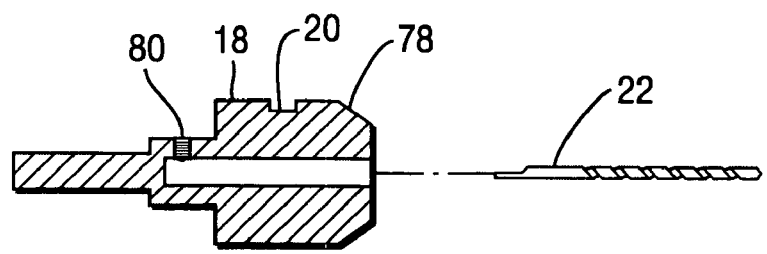
FIG. 22 is a side cross-sectional view of an embodiment of an adapter or chuck showing a set screw as the means for securement of the drill bit device therewithin.
Figure 23:
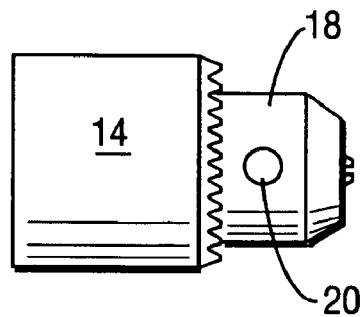
FIG. 23 is a side view of a conventional keyed chuck of the prior art.
Figure 24:
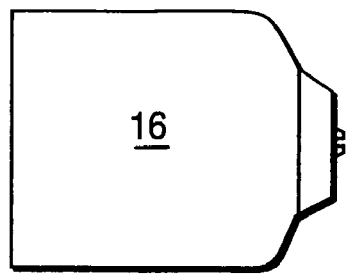
FIG. 24 is a side plan view of an embodiment of the present invention showing a single sleeve keyless chuck of the prior art.
Figure 25:
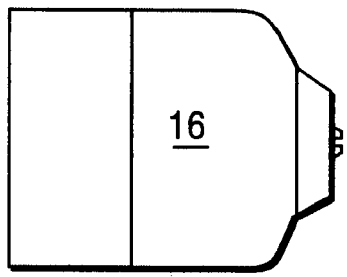
FIG. 25 is a side plan view of an embodiment of the present invention showing a double sleeve keyless chuck of the prior art.
Figure 26:
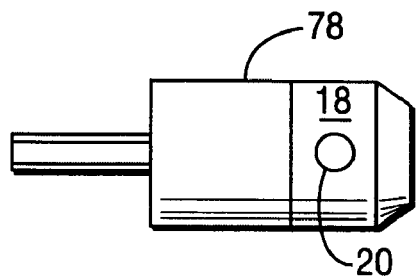
FIG. 26 is a side plan view of an embodiment of the present invention showing a keyless chuck or adapter defining a cylindrical mounting surface with at least one locking aperture defined therein.
Figure 27:
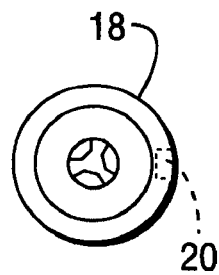
FIG. 27 is an embodiment of the present invention showing the three jaw configuration for a chuck.

Another manner of attaching the first bit devices 22 with respect to the rotatable chuck 14 or the adapter 78 is the use of a set screw 80 as shown in FIG. 22. In this design set screw 80 provides a set screw first bit retaining means.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the present invention.

I claim:

1. An improved bit holding attachment usable with a power tool having a rotatable chuck with a cylindrical mounting section defining at least one locking aperture means therein, the rotatable chuck being adapted to receive and retain a first bit device therewithin, said improved bit holding attachment comprising:
   A. a housing means comprising:
      (1) a mounting end means;
      (2) a mounting cavity means defined within said mounting end means of said housing means and being open and facing outwardly therefrom, said mounting cavity means being adapted to receive and detachably engage the cylindrical mounting section of the rotatable chuck of the power tool therewithin to be movable therewith;
      (3) a forward cavity means in fluid flow communication with respect to said mounting cavity means and adapted to be able to receive at least a portion of a first bit device therewithin responsive to securement of the cylindrical mounting section of the rotatable chuck of the power tool within said mounting cavity means;
      (4) a forward end means including a forward bit securement means for detachably receiving and retaining of a second bit device therein;
      (5) an annular slot means extending peripherally around said housing means and said mounting cavity means defined therewithin;
   B. at least one locking pin means movably mounted within said housing means and being extendable at least partially into said mounting cavity means to be selectively movable into said mounting cavity means for extending thereof into a locking aperture means to facilitate detachable engagement of the cylindrical mounting section of the rotatable chuck of the power tool within said mounting cavity means of said housing means;
   C. a resilient biasing means positioned within said mounting end means of said housing means thereof at a position radially beneath said annular slot means, said resilient biasing means adapted to be in abutment with respect to said locking pin means for resiliently urging thereof inwardly toward a locking aperture means defined in the cylindrical mounting section of the rotatable chuck responsive to positioning thereof within said mounting cavity means to facilitate detachable engagement therebetween; and
   D. a capping ring removably positionable within said annular slot means at a position extending over said resilient biasing means positioned within said mounting end means of said housing means, the capping ring extending completely around a circumference of said housing means for facilitating retaining of said resilient biasing means therebelow.

2. An improved bit holding attachment as defined in claim 1 wherein said mounting end means of said housing means further defines an annular groove means at a position extending around said mounting cavity means radially beneath said annular slot means, said annular groove means adapted to receive said resilient biasing means positioned therewithin in abutment with said locking pin means to facilitate exertion of inwardly directed bias thereagainst.

3. An improved bit holding attachment as defined in claim 2 wherein said resilient biasing means comprises a circular spring means and wherein said circular spring means is split to define a first spring end section and a second spring end section positioned spatially disposed from one another.

4. An improved bit holding attachment as defined in claim 3 wherein said locking pin means includes a first locking pin member extending from said annular groove means inwardly toward said mounting cavity means angularly oriented with respect to a radial direction and a second locking pin member spatially disposed from said first locking pin member and extending from said annular groove means inwardly toward said mounting cavity means angularly oriented with respect to the radial direction, said second locking pin member being obliquely angled oppositely from said first locking pin member to facilitate engagement with respect to a locking aperture means responsive to rotation of the cylindrical mounting section of the rotatable chuck in either direction relative to said mounting cavity means of said housing means, said first spring end section of said circular spring means being in abutment with respect to said first locking pin member for urging thereof selectively into engagement with respect to a locking aperture means brought into position thereadjacent, said second spring end section of said circular spring means being in abutment with respect to said second locking pin member for urging thereof selectively into engagement with respect to one of the locking aperture means brought into position thereadjacent, said housing means further including a first shoulder means positioned adjacent said first locking pin member which limits the radially inwardly directed movement of said first locking pin member, said housing means further including a second shoulder means positioned adjacent said second locking pin member which limits the radially inwardly directed movement of said second locking pin member.

5. An improved bit holding attachment as defined in claim 3 further comprising an anti-clocking pin means fixedly positioned within said annular groove means at a position between said first spring end means and said second spring end means to minimize movement of said circular spring means axially along said annular groove means to maintain proper alignment between said circular spring means and said locking pin means.

6. An improved bit holding attachment as defined in claim 5 wherein said anti-clocking pin means is pressed into engagement with respect to said housing means within said annular groove means.

7. An improved bit holding attachment as defined in claim 1 wherein each of said locking pin means includes a locking pin notch defined therein which is adapted to receive said resilient biasing means positioned thereinto to facilitate abutment with said locking pin means to facilitate biasing thereof inwardly toward said cylindrical mounting section.

8. An improved bit holding attachment as defined in claim 1 wherein said housing means further defines an intermediate cavity means positioned between and in fluid flow communication with respect to said forward cavity means and said mounting cavity means for facilitating use thereof with bit devices of increased size.

9. An improved bit holding attachment as defined in claim 8 wherein said intermediate cavity means is larger than said forward cavity means and smaller than said mounting cavity means.

10. An improved bit holding attachment as defined in claim 1 wherein said mounting cavity means and the cylindrical mounting section of the rotatable chuck are circular in cross-section.

11. An improved bit holding attachment as defined in claim 1 further comprising a guide sleeve means mounted on said housing means adjacent said forward end means thereof, said guide sleeve means being telescopingly movable longitudinally with respect to said housing means to be movable between a retracted storage position encircling said housing means adjacent said forward end means thereof and an extended operative position extending forwardly from said forward end means of said housing means to facilitate positioning thereof surrounding a second bit device attached to said forward end means by said forward bit securement means to facilitate guiding usage thereof.

12. An improved bit holding attachment as defined in claim 1 wherein said forward bit securement means further includes a magnetic retaining means to facilitate retaining of a second bit device by said forward bit securement means.

13. An improved bit holding attachment as defined in claim 1 wherein said forward bit securement means includes a hole means defined in said forward end means of said housing means for receiving a second bit device detachably mounted therewithin, said hole means being hexagonal in cross-section to facilitate rotational driving of a second bit device secured therewithin.

14. An improved bit holding apparatus usable with a power tool for facilitating detachably mounting of a first drilling bit device and a second drilling bit device with respect thereto which comprises:
  A. a rotatable chuck including:
    (1) a first bit device retaining means operative to detachably secure a first bit device with respect to said rotatable chuck;
    (2) a cylindrical mounting section defining at least one locking aperture means therein, said cylindrical mounting section adapted to rotate along with said rotatable chuck;
  B. a bit holding attachment comprising:
    (1) a housing means comprising: (a) a mounting end means; (b) a mounting cavity means defined within said mounting end means of said housing means and being open and facing outwardly therefrom, said mounting cavity means being adapted to receive and detachably engage said cylindrical mounting section of said rotatable chuck therewithin to be movable therewith; (c) a forward cavity means in fluid flow communication with respect to said mounting cavity means and adapted to be able to receive at least a portion of a first bit device therewithin responsive to securement of said cylindrical mounting section of said rotatable chuck within said mounting cavity means; (d) a forward end means including a forward bit securement means for detachably receiving and retaining of a second bit device therein; (e) an annular slot means extending peripherally around said housing means and said mounting cavity means defined therewithin;
    (2) at least one locking pin means movably mounted within said housing means and being extendable at least partially into said mounting cavity means to be selectively movable into said mounting cavity means for extending thereof into one of said locking aperture means to facilitate detachable engagement of said cylindrical mounting section of said rotatable chuck within said mounting cavity means of said housing means;
    (3) a resilient biasing means positioned within said mounting end means of said housing means thereof at a position radially beneath said annular slot means, said resilient biasing means adapted to be in abutment with respect to said locking pin means for resiliently urging thereof inwardly toward one of said locking aperture means defined in said cylindrical mounting section of said rotatable chuck responsive to positioning thereof within said mounting cavity means to facilitate detachable engagement therebetween; and
    (4) a capping ring removably positionable within said annular slot means at a position extending over said resilient biasing means positioned within said mounting end means of said housing means, the capping ring extending completely around a circumference of said housing means for facilitating retaining of said resilient biasing means therebelow.

15. An improved bit holding attachment as defined in claim 14 wherein said mounting end means of said housing means further defines an annular groove means at a position extending around said mounting cavity means radially beneath said annular slot means, said annular groove means adapted to receive said resilient biasing means positioned therewithin in abutment with said locking pin means to facilitate exertion of inwardly directed bias thereagainst.

16. An improved bit holding attachment as defined in claim 15 wherein said resilient biasing means comprises a circular spring means and wherein said circular spring means is split to define a first spring end section and a second spring end section positioned spatially disposed from one another.

17. An improved bit holding attachment as defined in claim 16 wherein said locking pin means includes a first locking pin member extending from said annular groove means inwardly toward said mounting cavity means angularly oriented with respect to the radial direction and a second locking pin member spatially disposed from said first locking pin member and extending from said annular groove means inwardly toward said mounting cavity means angularly oriented with respect to the radial direction, said second locking pin member being obliquely angled oppositely from said first locking pin member to facilitate engagement with respect to one of said locking aperture means responsive to rotation of said cylindrical mounting section of said rotatable chuck in either direction relative to said mounting cavity means of said housing means, said first spring end section of said circular spring means being in abutment with respect to said first locking pin member for urging thereof selectively into engagement with respect to one of said locking aperture means brought into position thereadjacent, said second spring end section of said circular spring means being in abutment with respect to said second locking pin member for urging thereof selectively into engagement with respect to one of said locking aperture means brought into position thereadjacent, said housing means further including a first shoulder means positioned adjacent said first locking pin member which limits the radially inwardly directed movement of said first locking pin member, said housing means further including a second shoulder means positioned adjacent said second locking pin member which limits the radially inwardly directed movement of said second locking pin member.

18. An improved bit holding attachment as defined in claim 16 further comprising an anti-clocking pin means fixedly positioned within said annular groove means at a position between said first spring end means and said second spring end means to minimize movement of said circular spring means axially along said annular groove means to maintain proper alignment between said circular spring means and said locking pin means.

19. An improved bit holding attachment as defined in claim 18 wherein said anti-clocking pin means is pressed into engagement with respect to said housing means within said annular groove means.

20. An improved bit holding attachment as defined in claim 14 wherein each of said locking pin means includes a locking pin notch defined therein which is adapted to receive said resilient biasing means positioned thereinto to facilitate abutment with said locking pin means to facilitate biasing thereof inwardly toward said cylindrical mounting surface.

21. An improved bit holding attachment as defined in claim 14 wherein said housing means further defines an intermediate cavity means positioned between and in fluid flow communication with respect to said forward cavity means and said mounting cavity means for facilitating use thereof with bit devices of increased size.

22. An improved bit holding attachment as defined in claim 21 wherein said intermediate cavity means is larger than said forward cavity means and smaller than said mounting cavity means.

23. An improved bit holding attachment as defined in claim 14 wherein said mounting cavity means and said cylindrical mounting section of said rotatable chuck are circular in cross-section.

24. An improved bit holding attachment as defined in claim 14 further comprising a guide sleeve means mounted on said housing means adjacent said forward end means thereof, said guide sleeve means being telescopingly movable longitudinally with respect to said housing means to be movable between a retracted storage position encircling said housing means adjacent said forward end means thereof and an extended operative position extending forwardly from said forward end means of said housing means to facilitate positioning thereof surrounding a second bit device attached to said forward end means by said forward bit securement means to facilitate guiding usage thereof.

25. An improved bit holding attachment as defined in claim 14 wherein said forward bit securement means further includes a magnetic retaining means to facilitate retaining of a second bit device by said forward bit securement means.

26. An improved bit holding attachment as defined in claim 14 wherein said forward bit securement means includes a hole means defined in said forward end means of said housing means for receiving a second bit device detachably mounted therewithin, said hole means being hexagonal in cross-section to facilitate rotational driving of a second bit device secured therewithin.

27. An improved bit holding attachment as defined in claim 14 wherein said rotatable chuck is a keyless rotatable chuck.

28. An improved bit holding attachment as defined in claim 14 wherein said rotatable chuck is a set screw mandrel chuck.

29. An improved bit holding apparatus usable with a power tool having a rotatable chuck mounted therein for facilitating detachably mounting of a first bit device and a second bit device with respect thereto which comprises:
   A. an adapter means separate from the rotatable chuck, the adapter means including:
      (1) a first bit device retaining means operative to detachably secure a first bit device with respect to said adapter means, the first bit device retaining means comprising a plurality of gripping jaws for gripping bit devices of different sizes;
      (2) a cylindrical mounting section defining at least one locking aperture means therein, said cylindrical mounting section adapted to rotate along with said adapter means; and
      (3) an adapter shaft extending from an end of the adapter means opposite the first bit device retaining means, the adapter shaft sized and shaped to be securely grasped by the rotatable chuck of the power tool;
      (4) a sleeve at an outer circumference of the adapter means for opening and securely closing the jaws without a key;
   B. a bit holding attachment comprising:
      (1) a housing means comprising: (a) a mounting end means; (b) a mounting cavity means defined within said mounting end means of said housing means and being open and facing outwardly therefrom, said mounting cavity means being sized and shaped to receive and detachably engage said cylindrical mounting section of said adapter means therewithin to be movable therewith; (c) a forward cavity means in fluid flow communication with respect to said mounting cavity means and adapted to be able to receive at least a portion of a first bit device therewithin responsive to securement of said cylindrical mounting section of said adapter means within said mounting cavity means; (d) a forward end means including a forward bit securement means for detachably receiving and retaining of a second bit device therein;
      (2) at least one locking pin means movably mounted within said housing means and being extendable at least partially into said mounting cavity means to be selectively movable into said mounting cavity means for extending thereof into one of said locking aperture means to facilitate detachable engagement of said cylindrical mounting section of said adapter means within said mounting cavity means of said housing means; and
      (3) a resilient biasing means positioned within said mounting end means of said housing means thereof, said resilient biasing means adapted to be in abutment with respect to said locking pin means for resiliently urging thereof inwardly toward one of said locking aperture means defined in said cylindrical mounting section of said adapter means responsive to positioning thereof within said mounting cavity means to facilitate detachable engagement there between.

30. An improved bit holding apparatus as defined in claim 29 wherein said mounting end means of said housing means further defines an annular groove means at a position extending around said mounting cavity means radially beneath said annular slot means, said annular groove means adapted to receive said resilient biasing means positioned therewithin in abutment with said locking pin means to facilitate exertion of inwardly directed bias thereagainst.

31. An improved bit holding apparatus as defined in claim 30 wherein said resilient biasing means comprises a circular spring means and wherein said circular spring means is split to define a first spring end section and a second spring end section positioned spatially disposed from one another.

32. An improved bit holding apparatus as defined in claim 31 wherein said locking pin means includes a first locking pin member extending from said annular groove 4 means inwardly toward said mounting cavity means angularly oriented with respect to the radial direction and a second locking pin member spatially disposed from said first locking pin member and extending from said annular groove means inwardly toward said mounting cavity means angularly oriented with respect to the radial direction, said second locking pin member being obliquely angled oppositely from said first locking pin member to facilitate engagement with respect to one of said locking aperture means responsive to rotation of said cylindrical mounting section of said adapter means in either direction relative to said mounting cavity means of said housing means, said first spring end section of said circular spring means being in abutment with respect to said first locking pin member for urging thereof selectively into engagement with respect to one of said locking aperture means brought into position thereadjacent, said second spring end section of said circular spring means being in abutment with respect to said second locking pin member for urging thereof selectively into engagement with respect to one of said locking aperture means brought into position thereadjacent, said housing means further including a first shoulder means positioned adjacent said first locking pin member which limits the radially inwardly directed movement of said first locking pin member, said housing means further including a second shoulder means positioned adjacent said second locking pin member which limits the radially inwardly directed movement of said second locking pin member.

33. An improved bit holding apparatus as defined in claim 31 further comprising an anti-clocking pin means fixedly positioned within said annular groove means at a position between said first spring end means and said second spring end means to minimize movement of said circular spring means axially along said annular groove means to maintain proper alignment between said circular spring means and said locking pin means.

34. An improved bit holding apparatus as defined in claim 33 wherein said anti-clocking pin means is pressed into engagement with respect to said housing means within said annular groove means.

35. An improved bit holding apparatus as defined in claim 29 wherein each of said locking pin means includes a locking pin notch defined therein which is adapted to receive said resilient biasing means positioned thereinto to facilitate abutment with said locking pin means to facilitate biasing thereof inwardly toward said cylindrical mounting surface.

36. An improved bit holding apparatus as defined in claim 29 wherein said housing means further defines an intermediate cavity means positioned between and in fluid flow communication with respect to said forward cavity means and said mounting cavity means for facilitating use thereof with bits devices of increased size.

37. An improved bit holding apparatus as defined in claim 36 wherein said intermediate cavity means is larger than said forward cavity means and smaller than said mounting cavity means.

38. An improved bit holding apparatus as defined in claim 29 wherein said mounting cavity means and said cylindrical mounting section of said adapter means are circular in cross-section.

39. An improved bit holding apparatus as defined in claim 29 further comprising a guide sleeve means mounted on said housing means adjacent said forward end means thereof, said guide sleeve means being telescopingly movable longitudinally with respect to said housing means to be movable between a retracted storage position encircling said housing means adjacent said forward end means thereof and an extended operative position extending forwardly from said forward end means of said housing means to facilitate positioning thereof surrounding a second bit device attached to said forward end means by said forward bit securement means to facilitate guiding usage thereof.

40. An improved bit holding apparatus as defined in claim 29 wherein said forward bit securement means further includes a magnetic retaining means to facilitate retaining of a second bit device by said forward bit securement means.

41. An improved bit holding apparatus as defined in claim 29 wherein said forward bit securement means includes a hole means defined in said forward end means of said housing means for receiving a second bit device detachably mounted therewithin, said hole means being hexagonal in cross-section to facilitate rotational driving of a second bit device secured therewithin.

42. The improved bit holding apparatus of claim 29, wherein:
the housing means has an annular slot means extending peripherally around said housing means and said mounting cavity means defined therewithin, and
the bit holding attachment further comprises a capping ring means removably positionable within said annular slot means at a position extending over said resilient biasing means positioned within said mounting end means of said housing means for facilitating retaining of said resilient biasing means therebelow.

43. The improved bit holding apparatus of claim 29, wherein the sleeve is without a keying mechanism.

* * * * *